United States Patent
Park et al.

(10) Patent No.: US 11,042,144 B2
(45) Date of Patent: Jun. 22, 2021

(54) BUILDING MANAGEMENT SYSTEM WITH DYNAMIC CHANNEL COMMUNICATION

(71) Applicant: Johnson Controls Technology Company, Auburn Hills, MI (US)

(72) Inventors: Youngchoon Park, Brookfield, WI (US); Vaidhyanathan Venkiteswaran, Brookfield, WI (US); Sudhi R. Sinha, Milwaukee, WI (US); Karl F. Reichenberger, Mequon, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 342 days.

(21) Appl. No.: 15/934,593

(22) Filed: Mar. 23, 2018

(65) Prior Publication Data

US 2018/0275625 A1    Sep. 27, 2018

Related U.S. Application Data

(60) Provisional application No. 62/476,655, filed on Mar. 24, 2017.

(51) Int. Cl.
  *G06F 15/16*     (2006.01)
  *G05B 19/05*     (2006.01)
  (Continued)

(52) U.S. Cl.
  CPC .......... *G05B 19/052* (2013.01); *G05B 15/02* (2013.01); *G05B 19/0421* (2013.01); *H04L 12/2814* (2013.01); *H04L 2012/285* (2013.01)

(58) Field of Classification Search
  CPC ............... H04L 12/2803; H04L 67/125; H04L 12/2816; H04L 61/609; H04L 12/2814;
  (Continued)

(56) References Cited

U.S. PATENT DOCUMENTS 7,889,051 B1 *   2/2011   Billig .................. H04L 61/2038
                                                340/5.23
8,503,330 B1 *   8/2013   Choong ................ H04W 24/02
                                                370/254
(Continued)

FOREIGN PATENT DOCUMENTS

WO    WO 2009/020158 A1    2/2009
WO    WO-2011/100255 A2    8/2011

OTHER PUBLICATIONS

Search Report for International Application No. PCT/US2018/024068, dated Jun. 15, 2018, 22 pages.
(Continued)

*Primary Examiner* — Oleg Survillo
(74) *Attorney, Agent, or Firm* — Foley & Lardner LLP

(57) ABSTRACT

A system for managing communication between building management system (BMS) devices includes a memory and a controller. The memory includes instructions stored thereon. The controller is configured to execute the instructions to implement an agent manager, a zone manager, and a channel manager. The agent manager is configured to generate an agent for each of the BMS devices. The zone manager is configured to define at least one zone relating to a physical location zone or a building control zone. The channel manager is configured to generate a communication channel associated with the at least one zone. The channel manager is further configured to manage registration of an agent to the communication channel, wherein an agent is configured to communicate over a communication channel in response to being registered to the communication channel.

20 Claims, 17 Drawing Sheets

(51) Int. Cl.
  *G05B 15/02* (2006.01)
  *G05B 19/042* (2006.01)
  *H04L 12/28* (2006.01)

(58) Field of Classification Search
  CPC ...... H04L 2012/285; G05B 2219/2614; G05B 19/052; G05B 19/0421; G05B 15/02
  See application file for complete search history.

(56) References Cited

U.S. PATENT DOCUMENTS

| | | | |
|---|---|---|---|
| 8,516,016 | B2 | 8/2013 | Park et al. |
| 8,532,808 | B2 | 9/2013 | Drees et al. |
| 8,532,839 | B2 | 9/2013 | Drees et al. |
| 8,600,556 | B2 | 12/2013 | Nesler et al. |
| 8,635,182 | B2 | 1/2014 | MacKay |
| 8,682,921 | B2 | 3/2014 | Park et al. |
| 8,731,724 | B2 | 5/2014 | Drees et al. |
| 8,788,097 | B2 | 7/2014 | Drees et al. |
| 8,843,238 | B2 | 9/2014 | Wenzel et al. |
| 9,196,009 | B2 | 11/2015 | Drees et al. |
| 9,286,582 | B2 | 3/2016 | Drees et al. |
| 9,354,968 | B2 | 5/2016 | Wenzel et al. |
| 9,753,455 | B2 | 9/2017 | Drees |
| 2003/0073432 | A1* | 4/2003 | Meade, II ............ G08C 17/02 455/420 |
| 2006/0140207 | A1* | 6/2006 | Eschbach ............ H04L 12/1836 370/432 |
| 2008/0186160 | A1 | 8/2008 | Kim et al. |
| 2010/0281387 | A1 | 11/2010 | Holland et al. |
| 2012/0062577 | A1* | 3/2012 | Nixon ............... G05B 23/0272 345/522 |
| 2012/0136485 | A1* | 5/2012 | Weber .................. H05B 47/19 700/275 |
| 2013/0038430 | A1* | 2/2013 | Blower .............. H04L 12/2803 340/12.22 |
| 2013/0246916 | A1* | 9/2013 | Reimann ............ H04N 21/8113 715/716 |
| 2014/0172184 | A1 | 6/2014 | Schmidt et al. |
| 2014/0269614 | A1 | 9/2014 | Maguire et al. |
| 2015/0042240 | A1 | 2/2015 | Aggarwal et al. |
| 2015/0241895 | A1* | 8/2015 | Lu ........................ G05B 15/02 700/295 |
| 2016/0363336 | A1* | 12/2016 | Roth ...................... F24F 11/30 |
| 2017/0011318 | A1 | 1/2017 | Vigano et al. |
| 2017/0070775 | A1 | 3/2017 | Taxier et al. |
| 2017/0322534 | A1* | 11/2017 | Sinha ................ G05B 19/0426 |
| 2019/0163152 | A1* | 5/2019 | Worrall ................. G06Q 50/06 |

OTHER PUBLICATIONS

Balaji et al, Brick: Metadata schema for portable smart building applications, dated Sep. 25, 2017, 20 pages.
Balaji et al, Brick: Towards a Unified Metadata Schema for Buildings, dated Nov. 16-17, 2016, 10 pages.
Bhattacharya, et al., Short Paper: Analyzing Metadata Schemas for Buildings—The Good, the Bad and the Ugly, ACM, Nov. 4-5, 2015, 4 pages.
Brick: Towards a Unified Metadata Schema for Buildings, dated Nov. 16, 2016, 46 pages.
Building Blocks for Smart Buildings, BrickSchema.org, 17 pages.
Fierro et al., Beyond a House of Sticks: Formalizing Metadata Tags with Brick, dated Nov. 13-14, 2019, 10 pages.
Fierro et al., Dataset: An Open Dataset and Collection Tool for BMS Point Labels, dated Nov. 10, 2019, 3 pages.
Fierro et al., Design and Analysis of a Query Processor for Brick, dated Jan. 2018, 25 pages.
Fierro et al., Design and Analysis of a Query Processor for Brick, dated Nov. 8-9, 2017, 10 pages.
Fierro et al., Mortar: An Open Testbed for Portable Building Analytics, dated Nov. 7-8, 2018, 10 pages.
Fierro et al., Why Brick is a Game Changer for Smart Buildings, 67 pages.
Fierro, Writing Portable Building Analytics with the Brick Metadata Schema, UC Berkeley ACM E-Energy, 2019, 39 pages.
Gao et al., A large-scale evaluation of automated metadata inference approaches on sensors from air handling units, dated May 1, 2018, pp. 14-30.
Koh et al., Plaster: An Integration, Benchmark, and Development Framework for Metadata Normalization Methods, dated Nov. 7-8, 2018, 10 pages.
Koh et al., Scrabble: Transferrable Semi-Automated Semantic Metadata Normalization using Intermediate Representation, dated Nov. 7-8, 2018, 10 pages.
Koh et al., Who can Access What, and When?, dated Nov. 13-14, 2019, 4 pages.
Metadata Schema for Buildings, 3 pages, Brickschema.org.
Building Blocks for Smart Buildings, BrickSchema.org, Mar. 2019, 17 pages.
Fierro et al., Why Brick is a Game Changer for Smart Buildings, Memoori Webinar, 2019, 67 pages.
Metadata Schema for Buildings, 3 pages, Brickschema.org (Cannot confirm date.).

* cited by examiner

| Raw Data Timeseries | | Average Quarter-Hour Timeseries | | Average Hourly Timeseries | | Average Daily Timeseries | |
|---|---|---|---|---|---|---|---|
| Timestamp | Value | Timestamp | Value | Timestamp | Value | Timestamp | Value |
| 2015-12-31T23:10:00 | 10 | 2015-12-31T23:00:00 | 10 | 2015-12-31T23:00:00 | 28.8 | 2015-12-31T23:00:00 | 28.8 |
| 2015-12-31T23:20:01 | 20 | 2015-12-31T23:15:00 | 20 | | | | |
| 2015-12-31T23:30:02 | 30 | 2015-12-31T23:30:00 | 35 | | | | |
| 2015-12-31T23:40:03 | 40 | 2015-12-31T23:45:00 | 50 | | | | |
| 2015-12-31T23:50:04 | 50 | 2016-01-01T00:00:00 | 65 | 2016-01-01T00:00:00 | 87.5 | 2016-01-01T00:00:00 | 87.5 |
| 2016-01-01T00:00:05 | 60 | 2016-01-01T00:15:00 | 80 | | | | |
| 2016-01-01T00:10:06 | 70 | 2016-01-01T00:30:00 | 95 | | | | |
| 2016-01-01T00:20:07 | 80 | 2016-01-01T00:45:00 | 110 | | | | |
| 2016-01-01T00:30:08 | 90 | | | | | | |
| 2016-01-01T00:40:09 | 100 | | | | | | |
| 2016-01-01T00:50:10 | 110 | | | | | | |

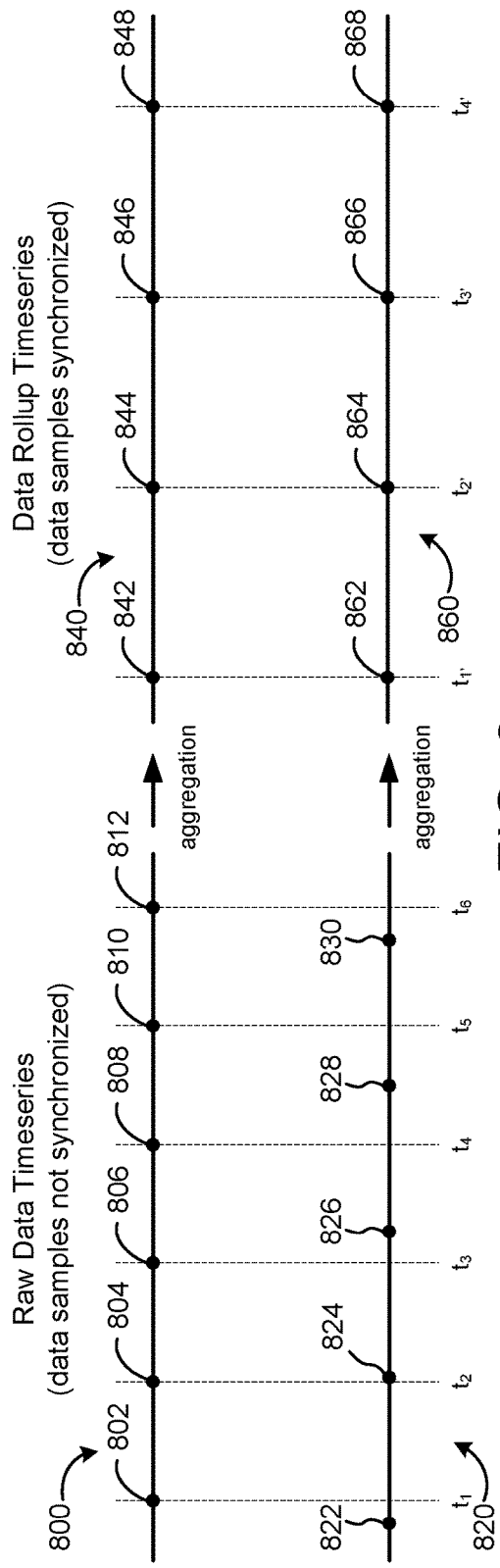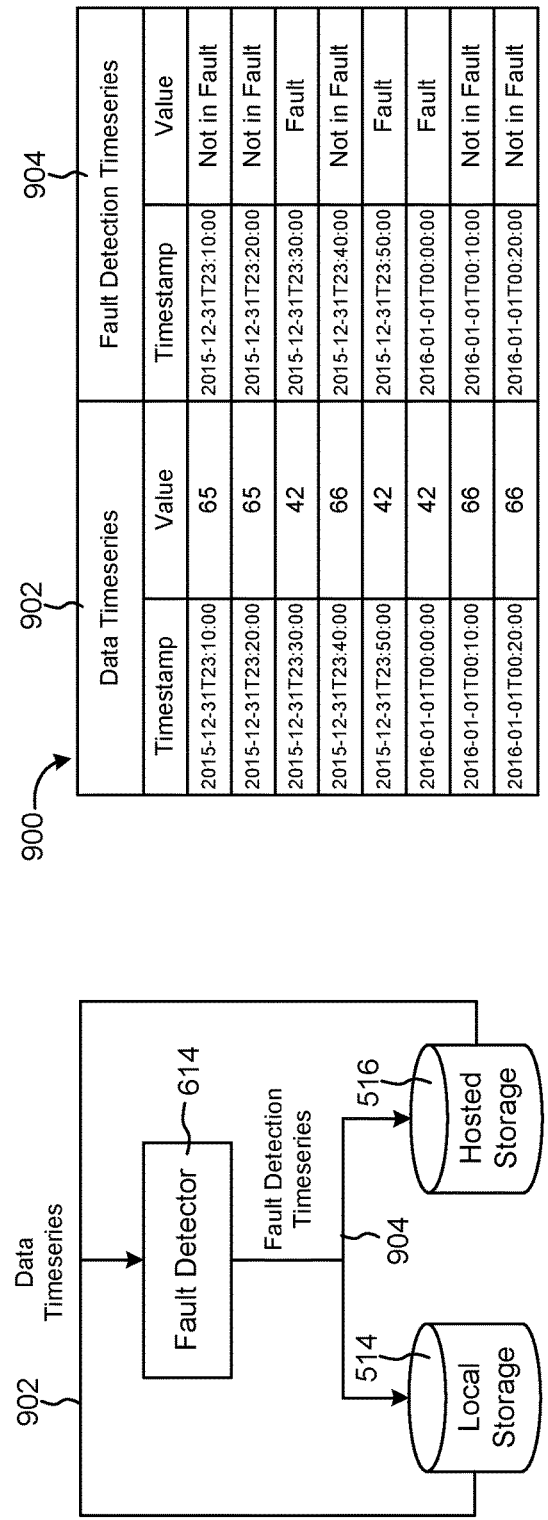

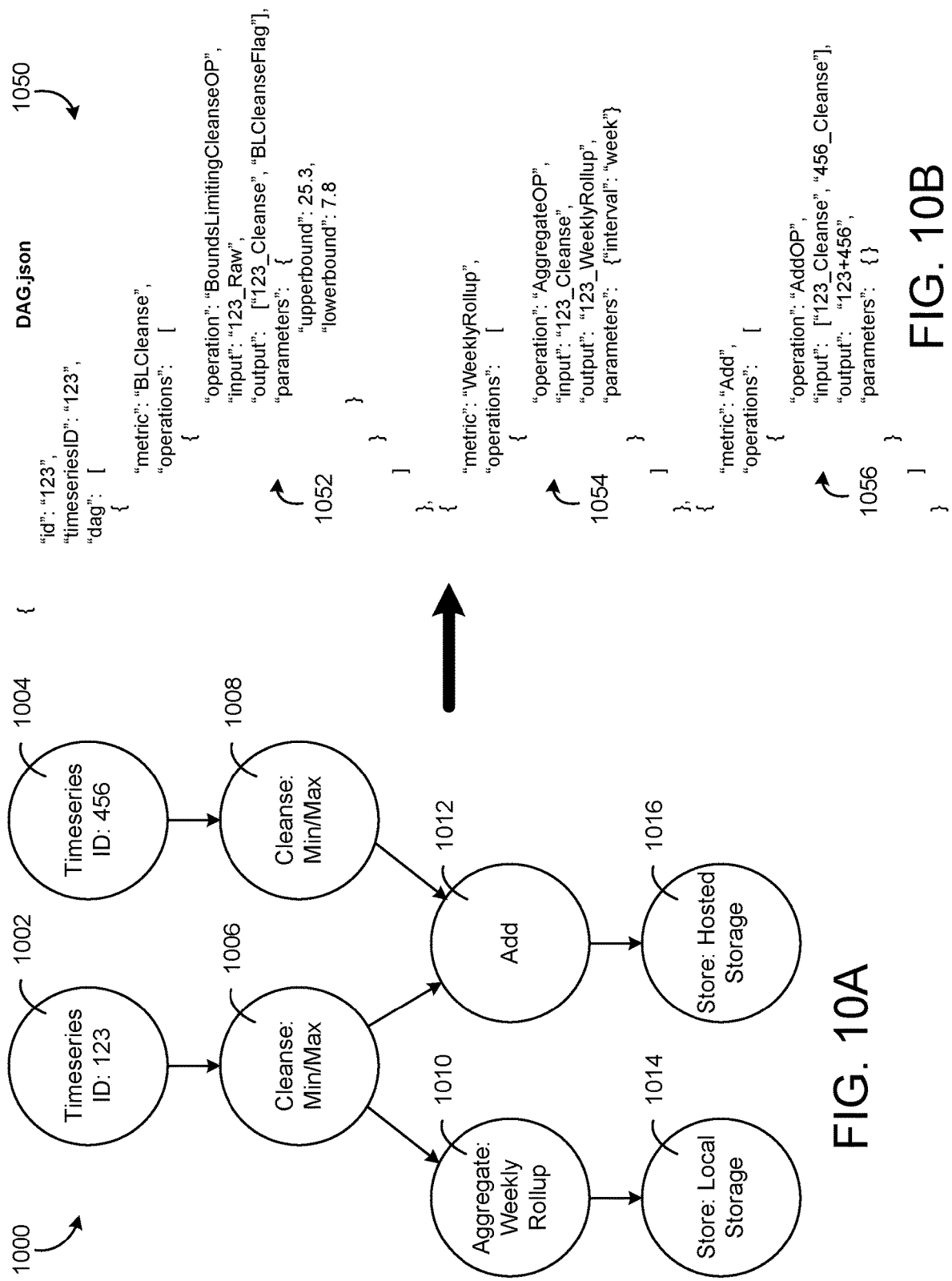

1600 ⤵

[{ 'zone': 'z0',
        'children': [{'zone': 'z1',
                'children': [{'zone': 'z2',
                        'children' : [{'id': 'y'}
                                {'zone': 'z3', 'children': [{'id': 'x', 'link': 'nz0/p'}]},
                                {'zone': 'z4', 'children': [{'id': 'w', 'link': 'nz0/q'}]}]}]}]},
{'zone': 'nz0',
        'children': [{'id': 'p'}
                {'id': 'q'}]}]

BUILDING MANAGEMENT SYSTEM WITH DYNAMIC CHANNEL COMMUNICATION

CROSS-REFERENCE TO RELATED PATENT APPLICATION

This application claims the benefit of and priority to U.S. Provisional Patent Application No. 62/476,655 filed Mar. 24, 2017, the entire disclosure of which is incorporated by reference herein.

BACKGROUND

The present disclosure relates generally to the field of building management systems. A building management system (BMS) is, in general, a system of devices configured to control, monitor, and manage equipment in or around a building or building area. A BMS can include, for example, a HVAC system, a security system, a lighting system, a fire alerting system, and any other system that is capable of managing building functions or devices, or any combination thereof. While the present disclosure discusses dynamic channel communication in the context of a BMS, it should be understood that the systems and methods disclosed herein can be used in other applications in which devices communication with one another.

A BMS may include multiple devices, such as sensors, controllers, thermostats, lighting controllers, HVAC devices, security devices, etc. These devices may communicate with a remote server, such as a cloud-based server, to obtain information. A device may be considered an Internet-of-Things (IoT) device if the device is in communication with a cloud-based server. In some systems, an IoT device may not be able to communicate directly with another IoT device, thereby requiring each device to obtain data from, or transfer data to other devices in the IoT system. This can make collaboration (e.g. control something, provide information, etc.) between devices difficult, as the IoT device may have limited knowledge of the other devices. Due to this lack of direct communication between IoT devices, current applications (e.g., optimizations) often create data warehouse-like structures to filter and distribute information. This may create complex deployment issues and challenges in edge, hybrid, and other computing environments.

SUMMARY

One implementation of the present disclosure is a system for managing communication between building management system (BMS) devices. The system includes a memory and a controller. The memory includes instructions stored thereon. The controller is configured to execute the instructions to implement an agent manager, a zone manager, and a channel manager. The agent manager is configured to generate an agent for each of the BMS devices. The zone manager is configured to define at least one zone relating to a physical location zone or a building control zone. The channel manager is configured to generate a communication channel associated with the at least one zone. The channel manager is further configured to manage registration of an agent to the communication channel, wherein an agent is configured to communicate over a communication channel in response to being registered to the communication channel.

Another implementation of the present disclosure is a method for managing a communication channel. The method includes generating, by a controller, an agent corresponding to each of a set of building management system (BMS) devices. The method also includes configuring, by the controller, at least one zone relating to a physical location zone or a building control zone. The method also includes generating, by the controller, a communication channel associated with the at least one zone. The method also includes managing, by the controller, registration of an agent to the communication channel. The method also includes communicating, by an agent, over a communication channel in response to being registered to the communication channel.

BRIEF DESCRIPTION OF THE DRAWINGS

FIG. 8 is a drawing of several timeseries illustrating the synchronization of data samples which can be performed by the data aggregator shown in FIG. 6, according to some embodiments.

FIG. 9A is a flow diagram illustrating the creation and storage of a fault detection timeseries which can be performed by the fault detector shown in FIG. 6, according to some embodiments.

FIG. 9B is a data table which can be used to store the raw data timeseries and the fault detection timeseries, according to some embodiments.

FIG. 10A is a directed acyclic graph (DAG) which can be generated by the DAG generator of FIG. 6, according to some embodiments.

FIG. 10B is a code snippet which can be automatically generated by the DAG generator of FIG. 6 based on the DAG, according to some embodiments.

DETAILED DESCRIPTION

Overview

Figure 1:
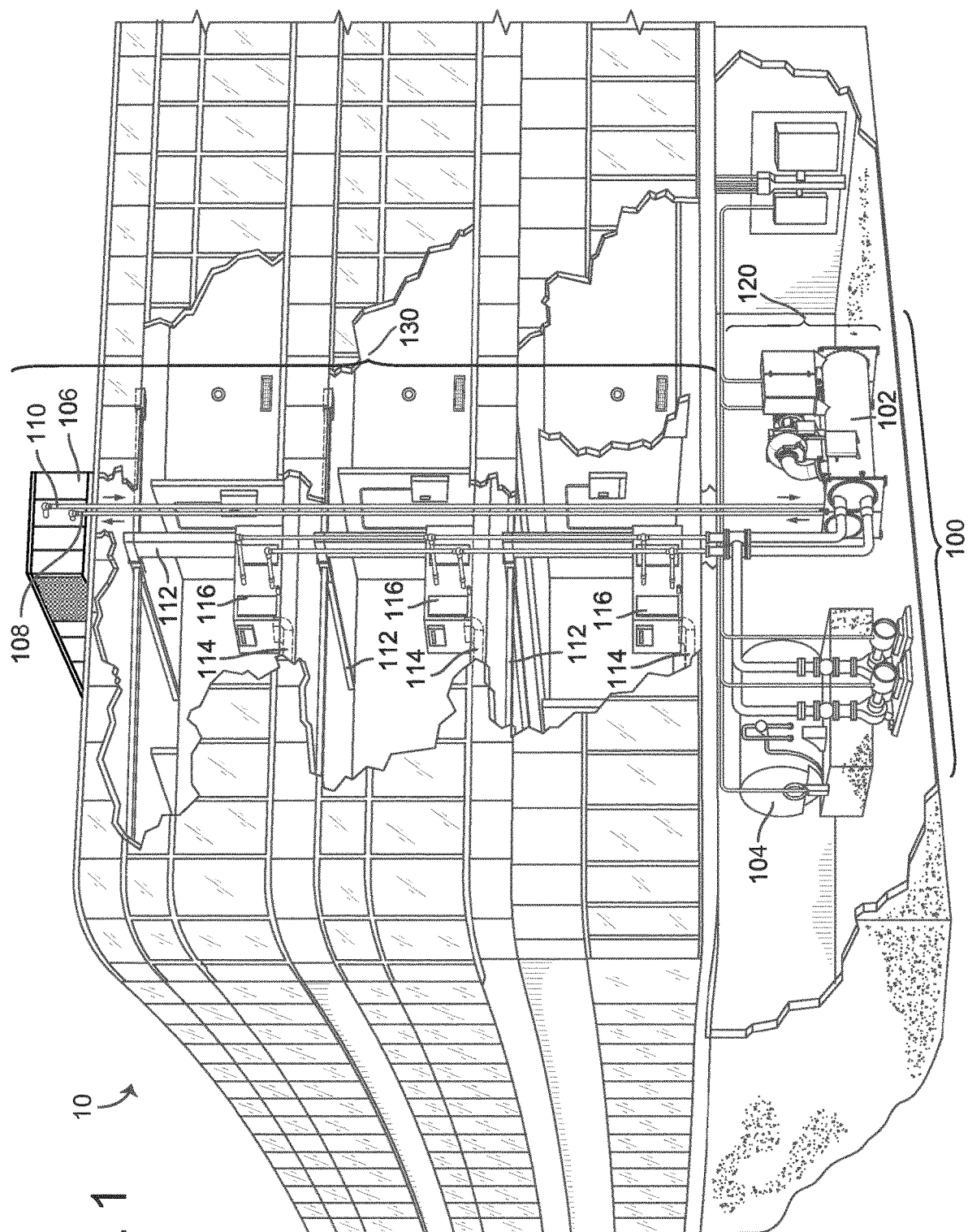
FIG. 1 is a drawing of a building equipped with a building management system (BMS) and a HVAC system, according to some embodiments.

Referring generally to the FIGURES, a system for dynamically managing communication in a building management system (BMS) is shown, according to various embodiments. The BMS may include an agent-based communication system configured to facilitate communications among various devices, including BMS devices and other computing devices. In some embodiments, communication to a device partially depends on the device's relationship to one or more zones. A communication channel may be generated for each zone, and an "agent" may be provided for each device. An agent may be configured to publish messages to the communication channel and/or subscribe to the communication channel, allowing the agent to receive messages published to the communication channel.

In some embodiments, one or more zones correspond to building spaces defined according to a building zone hierarchy having various parent-child relationships. For example, a top-level or "parent" zone may correspond to a building, and each floor within the building may correspond to a "child" relationship relative to the zone of the building. Further, each room within a particular floor may correspond to a child relationship relative to the floor. BMS devices (e.g., thermostats, HVAC devices, sensors) and other computing devices (e.g., a personal device) may be mapped within particular zones. Accordingly, when an agent of one device publishes a message to a channel associated with a zone (e.g., a room), another agent may automatically receive the message based on a particular parent-child relationship and the configuration of the communication channel. In some embodiments, messages published over a communication channel can be archived for subsequent retrieval.

In some embodiments, a communication channel may be established for a zone corresponding to a control circuit. An example control circuit may include one or more thermostats, chillers, VAV's, and/or occupancy sensors configured across various building spaces within the building zone hierarchy. A communication channel for the control circuit can be dynamically managed, such that agents may be subscribed to or unsubscribed from the channel, and/or permissions to publish to the channel may be modified, in response to devices being added to or removed from the control circuit. A building device in the control circuit (e.g., the chiller) can be operated according to registration of one or more agents, each corresponding to a computing device of an occupant, to the communication channel.

In some embodiments, a communication channel may be dynamically generated and managed according to an overlap of geolocation zone(s) and/or physical location zone(s). For example, a user may have a computing device with a corresponding agent, and a geolocation zone may relate to a predetermined area around the computing device. A physical location zone may correspond to a predetermined area around a physical location, such as a building, an area within a building, or an area outside a building. When the user's geolocation zone overlaps with another user's geolocation zone and/or a physical location zone, a communication channel may be dynamically generated, enabling communication among the agents registered to the communication channel.

The use of agents and agent-based communication can provide multiple advantages over current BMS systems. For example, agent-based building simulation may allow for a single integrated system from design to commissioning to operations. Agent based building simulation also allows for heavy use and reuse of design inputs, as well as for ease of commissioning (e.g. such as by eliminating the need for explicit point binding.) Agents may allow for goal-oriented optimization within the BMS. Further, agents can be used to allow for agile deployment of new features (e.g. via the agents) when the BMS is in operations mode. The agents can be run on different devices within the system (e.g. cloud, server, controller, smartboards, etc.) and can allow for system scalability without complexity (e.g. via agents forming building blocks.) Additionally, cloud replicas or virtual simulations of a building can allow for analytics and machine learning to be performed.

Agent-based communication systems described herein can facilitate speed and efficiency improvements over existing systems. For example, communication channels can be automatically created in response to a set of conditions, and may be dynamically modified according to changing events or conditions. In some embodiments, the conditions may be defined by the agents, for example according to building management system controls, occupancy within zones, and the like. By registering an agent to a particular zone within a defined building zone hierarchy, messages can be automatically communicated upstream to parent zones and/or downstream to child zones. Furthermore, ad hoc generation of communication channels enables communication to be dynamically managed for a particular purpose. Accordingly, for example, messages that are sent, received, archived, and/or retrieved over a communication channel can be limited to the purpose (e.g., by limiting the devices that may publish messages, or the types of messages from each device) and dynamically modified. The communication channel may in effect perform similar to a "filtered" channel, simplifying analysis of published information, requiring less data to be searched by subscribers to the communication channel (e.g., a building controller) and fewer computer processor cycles.

Building Management System and HVAC System

Referring now to FIGS. 1-4, an exemplary building management system (BMS) and HVAC system in which the systems and methods of the present disclosure can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, and any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
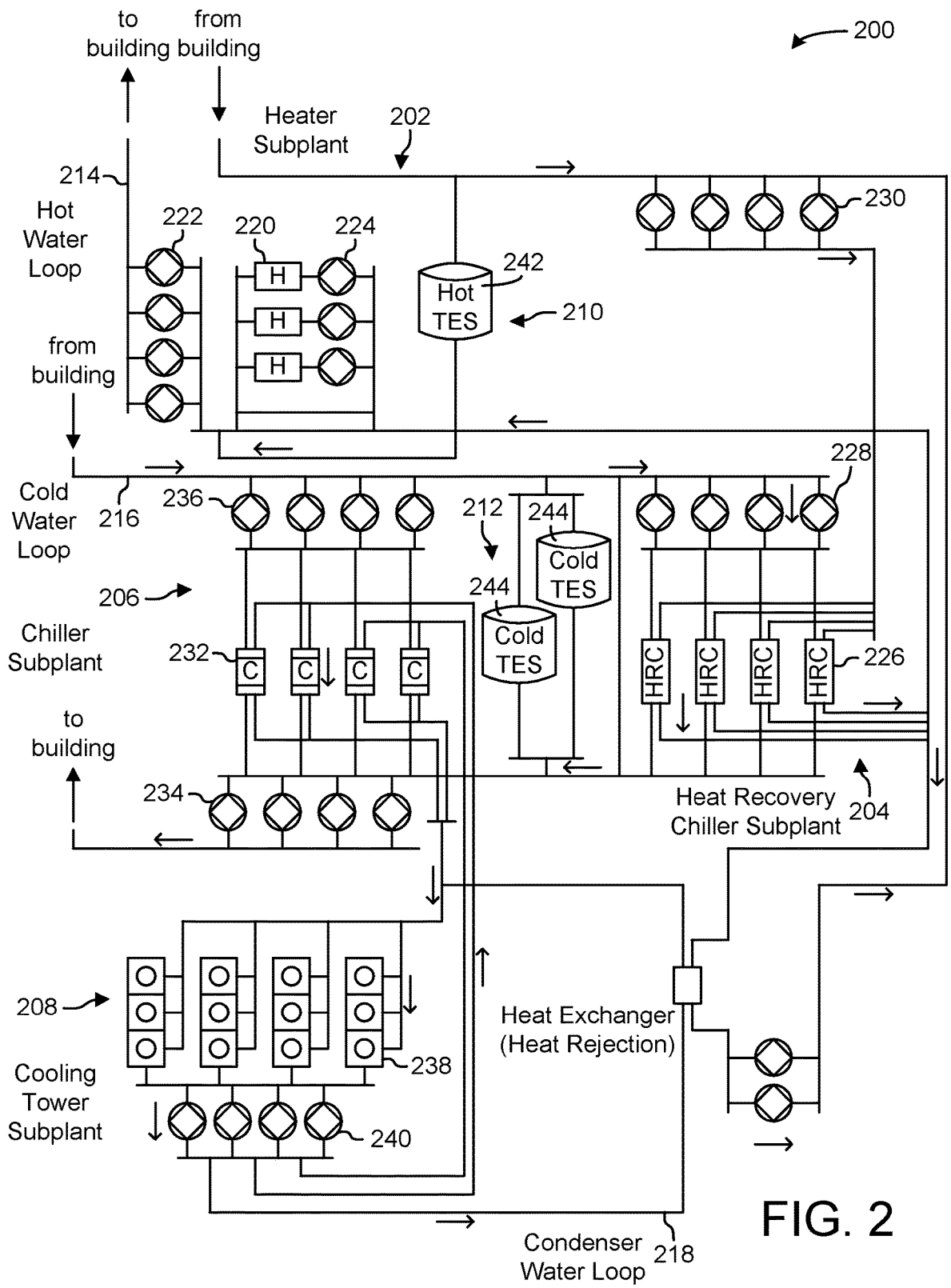
FIG. 2 is a schematic of a waterside system which can be used as part of the HVAC system of FIG. 1, according to some embodiments.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
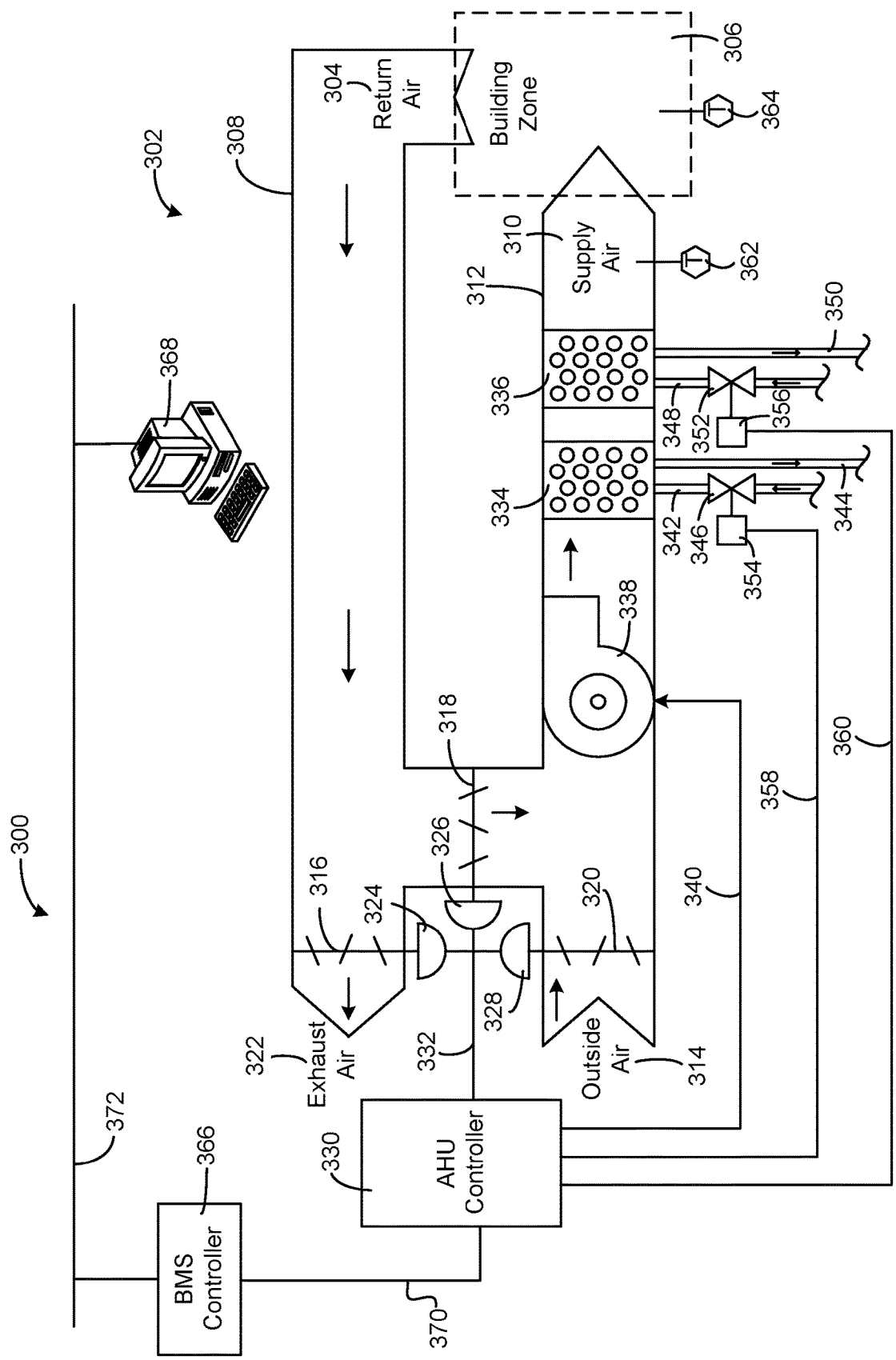
FIG. 3 is a block diagram of an airside system which can be used as part of the HVAC system of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310

(e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
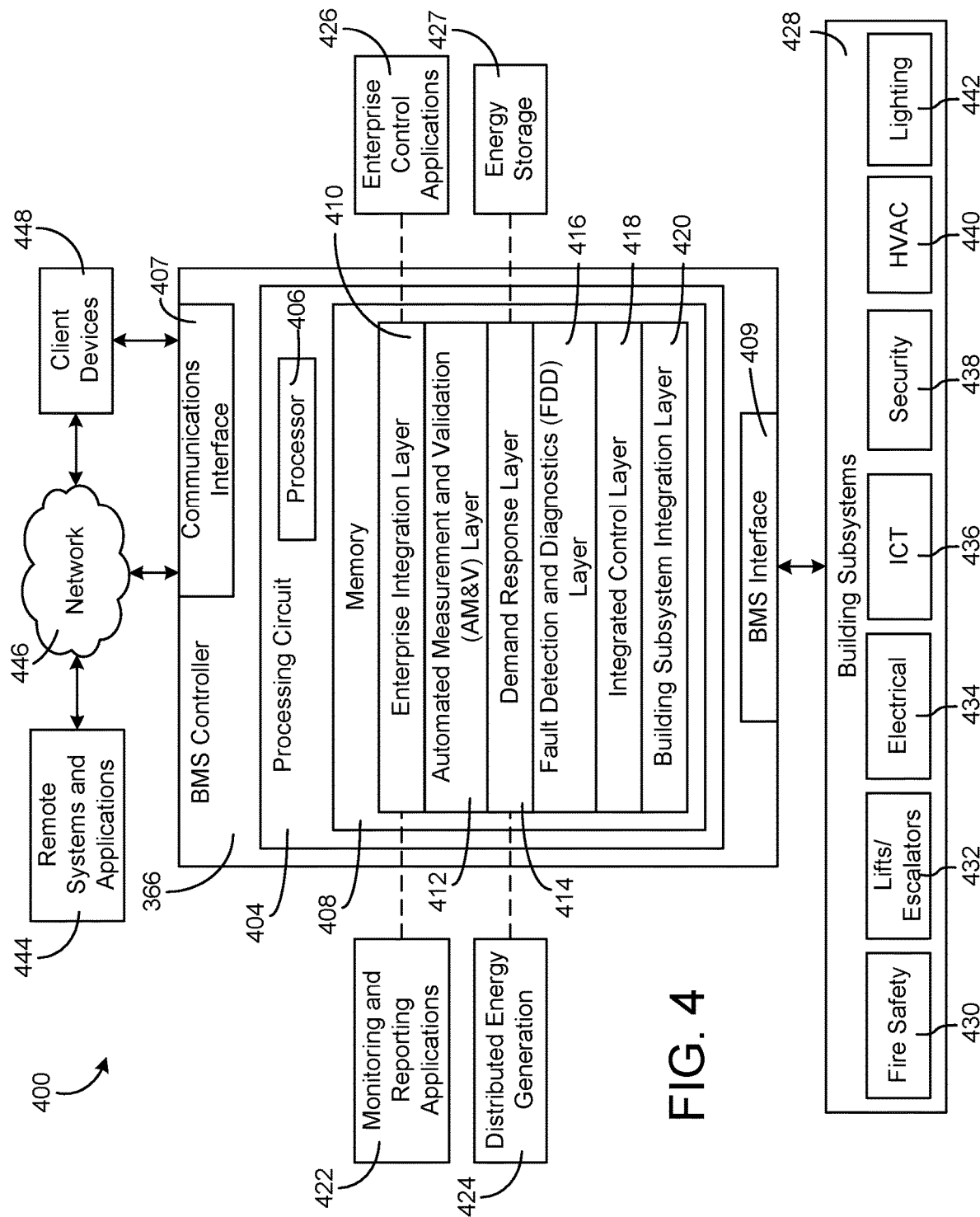
FIG. 4 is a block diagram of a BMS which can be used in the building of FIG. 1, according to some embodiments.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Building Management System with Data Platform Services

Figure 5:
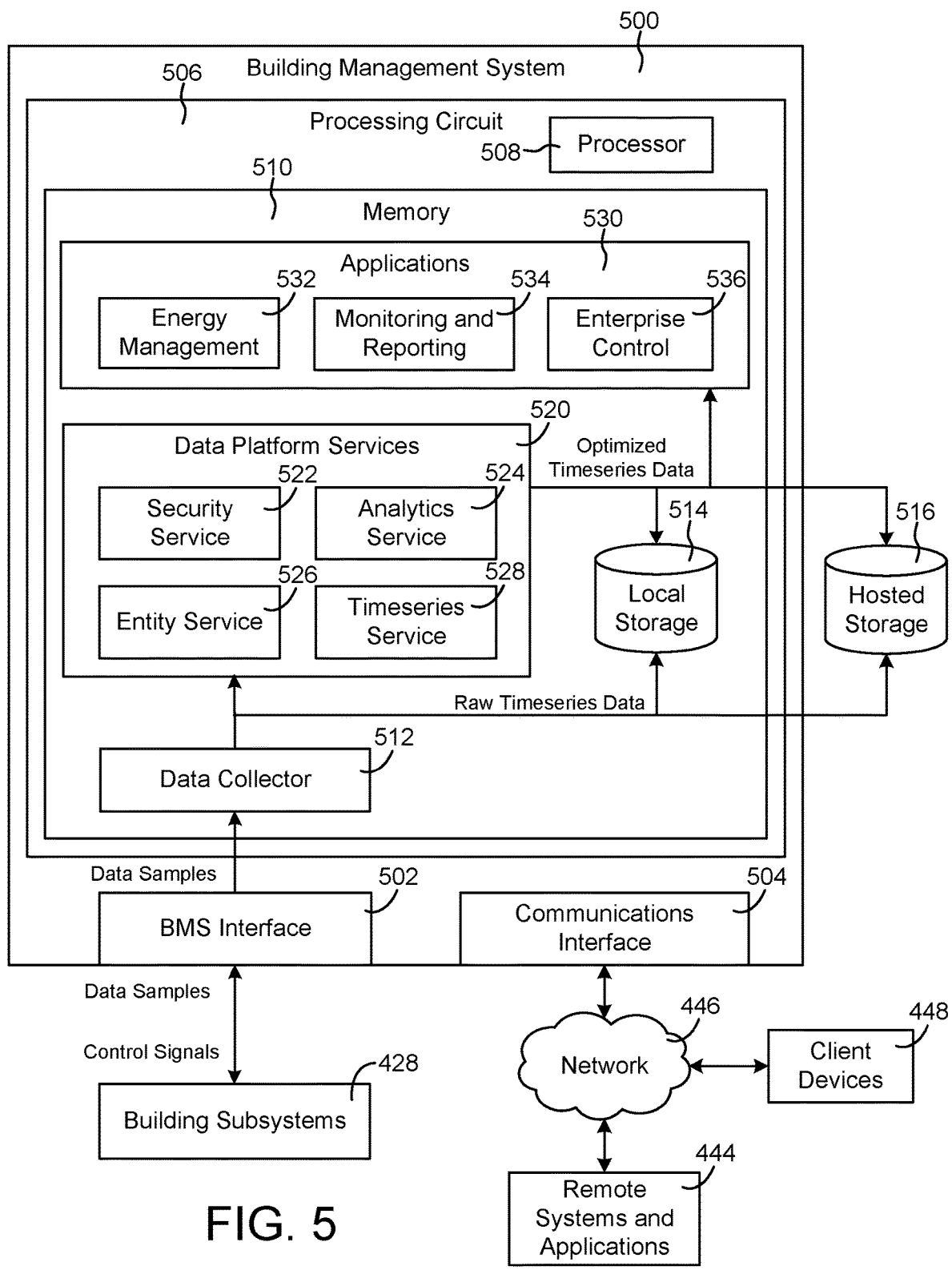
FIG. 5 is a block diagram of another BMS which can be used in the building of FIG. 1, including a data collector, data platform services, applications, and a dashboard layout generator, according to some embodiments.

Referring now to FIG. 5, a block diagram of another building management system (BMS) 500 is shown, according to some embodiments. BMS 500 can be configured to collect data samples from building subsystems 428 and generate raw timeseries data from the data samples. BMS 500 can process and transform the raw timeseries data using data platform services 520 to generate optimized timeseries data. Throughout this disclosure, the term "optimized timeseries data" is used to describe the result or output of a transformation or other timeseries processing operation performed by data platform services 520 (e.g., data aggregation, data cleansing, virtual point calculation, etc.). The optimized timeseries data can be provided to various applications 530 and/or stored in local storage 514 or hosted storage 516 (e.g., as materialized views of the raw timeseries data). In some embodiments, BMS 500 separates data collection; data storage, retrieval, and analysis; and data visualization into three different layers. This allows BMS 500 to support a variety of applications 530 that use the optimized timeseries data and allows new applications 530 to reuse the existing infrastructure provided by data platform services 520.

Before discussing BMS 500 in greater detail, it should be noted that the components of BMS 500 can be integrated within a single device (e.g., a supervisory controller, a BMS controller, etc.) or distributed across multiple separate systems or devices. For example, the components of BMS 500 can be implemented as part of a METASYS® brand building automation system, as sold by Johnson Controls Inc. In other embodiments, some or all of the components of BMS 500 can be implemented as part of a cloud-based computing system configured to receive and process data from one or more building management systems. In other embodiments, some or all of the components of BMS 500 can be components of a subsystem level controller (e.g., a HVAC controller), a subplant controller, a device controller (e.g., AHU controller 330, a chiller controller, etc.), a field controller, a computer workstation, a client device, or any other system or device that receives and processes data from building equipment.

BMS 500 can include many of the same components as BMS 400, as described with reference to FIG. 4. For example, BMS 500 is shown to include a BMS interface 502 and a communications interface 504. Interfaces 502-504 can include wired or wireless communications interfaces (e.g., jacks, antennas, transmitters, receivers, transceivers, wire terminals, etc.) for conducting data communications with building subsystems 428 or other external systems or devices. Communications conducted via interfaces 502-504 can be direct (e.g., local wired or wireless communications) or via a communications network 446 (e.g., a WAN, the Internet, a cellular network, etc.).

Communications interface 504 can facilitate communications between BMS 500 and external applications (e.g., remote systems and applications 444) for allowing user control, monitoring, and adjustment to BMS 500. Communications interface 504 can also facilitate communications between BMS 500 and client devices 448. BMS interface 502 can facilitate communications between BMS 500 and building subsystems 428. BMS 500 can be configured to communicate with building subsystems 428 using any of a variety of building automation systems protocols (e.g., BACnet, Modbus, ADX, etc.). In some embodiments, BMS 500 receives data samples from building subsystems 428 and provides control signals to building subsystems 428 via BMS interface 502.

Building subsystems 428 can include building electrical subsystem 434, information communication technology (ICT) subsystem 436, security subsystem 438, HVAC subsystem 440, lighting subsystem 442, lift/escalators subsystem 432, and/or fire safety subsystem 430, as described with reference to FIG. 4. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3. Each of building subsystems 428 can include any number of devices, controllers, and connections for completing its individual functions and control activities. Building subsystems 428 can include building equipment (e.g., sensors, air handling units, chillers, pumps, valves, etc.) configured to monitor and control a building condition such as temperature, humidity, airflow, etc.

Still referring to FIG. 5, BMS 500 is shown to include a processing circuit 506 including a processor 508 and memory 510. Processor 508 can be a general purpose or specific purpose processor, an application specific integrated circuit (ASIC), one or more field programmable gate arrays (FPGAs), a group of processing components, or other suitable processing components. Processor 508 is configured to execute computer code or instructions stored in memory 510 or received from other computer readable media (e.g., CDROM, network storage, a remote server, etc.).

Memory 510 can include one or more devices (e.g., memory units, memory devices, storage devices, etc.) for storing data and/or computer code for completing and/or facilitating the various processes described in the present disclosure. Memory 510 can include random access memory (RAM), read-only memory (ROM), hard drive storage, temporary storage, non-volatile memory, flash memory, optical memory, or any other suitable memory for storing software objects and/or computer instructions. Memory 510 can include database components, object code components, script components, or any other type of information structure for supporting the various activities and information structures described in the present disclosure. Memory 510 can be communicably connected to processor 508 via processing circuit 506 and can include computer code for executing (e.g., by processor 508) one or more processes described herein. When processor 508 executes instructions stored in memory 510, processor 508 generally configures processing circuit 506 to complete such activities.

Still referring to FIG. 5, BMS 500 is shown to include a data collector 512. Data collector 512 is shown receiving data samples from building subsystems 428 via BMS interface 502. In some embodiments, the data samples include data values for various data points. The data values can be measured or calculated values, depending on the type of data point. For example, a data point received from a temperature sensor can include a measured data value indicating a temperature measured by the temperature sensor. A data point received from a chiller controller can include a calculated data value indicating a calculated efficiency of the chiller. Data collector 512 can receive data samples from multiple different devices within building subsystems 428.

The data samples can include one or more attributes that describe or characterize the corresponding data points. For example, the data samples can include a name attribute defining a point name or ID (e.g., "B1F4R2.T-Z"), a device attribute indicating a type of device from which the data samples is received (e.g., temperature sensor, humidity sensor, chiller, etc.), a unit attribute defining a unit of measure associated with the data value (e.g., ° F., ° C., kPA, etc.), and/or any other attribute that describes the corresponding data point or provides contextual information regarding the data point. The types of attributes included in each data point can depend on the communications protocol used to send the data samples to BMS 500. For example, data samples received via the ADX protocol or BACnet protocol can include a variety of descriptive attributes along with the data value, whereas data samples received via the Modbus protocol may include a lesser number of attributes (e.g., only the data value without any corresponding attributes).

In some embodiments, each data sample is received with a timestamp indicating a time at which the corresponding data value was measured or calculated. In other embodiments, data collector 512 adds timestamps to the data samples based on the times at which the data samples are received. Data collector 512 can generate raw timeseries data for each of the data points for which data samples are received. Each timeseries can include a series of data values for the same data point and a timestamp for each of the data values. For example, a timeseries for a data point provided by a temperature sensor can include a series of temperature values measured by the temperature sensor and the corresponding times at which the temperature values were measured. An example of a timeseries which can be generated by data collector 512 is as follows:

[<key,timestamp$_1$,value$_1$>, <key,timestamp$_2$,value$_2$>, <key, timestamp$_3$,value$_3$>]

where key is an identifier of the source of the raw data samples (e.g., timeseries ID, sensor ID, etc.), timestamp$_i$ identifies the time at which the ith sample was collected, and value$_i$ indicates the value of the ith sample.

Data collector 512 can add timestamps to the data samples or modify existing timestamps such that each data sample includes a local timestamp. Each local timestamp indicates the local time at which the corresponding data sample was measured or collected and can include an offset relative to universal time. The local timestamp indicates the local time at the location the data point was measured at the time of measurement. The offset indicates the difference between the local time and a universal time (e.g., the time at the international date line). For example, a data sample collected in a time zone that is six hours behind universal time can include a local timestamp (e.g., Timestamp=2016-03-18T14:10:02) and an offset indicating that the local timestamp is six hours behind universal time (e.g., Offset=−6:00). The offset can be adjusted (e.g., +1:00 or −1:00) depending on whether the time zone is in daylight savings time when the data sample is measured or collected.

The combination of the local timestamp and the offset provides a unique timestamp across daylight saving time boundaries. This allows an application using the timeseries data to display the timeseries data in local time without first converting from universal time. The combination of the local timestamp and the offset also provides enough information to convert the local timestamp to universal time without needing to look up a schedule of when daylight savings time occurs. For example, the offset can be subtracted from the local timestamp to generate a universal time value that corresponds to the local timestamp without referencing an external database and without requiring any other information.

In some embodiments, data collector 512 organizes the raw timeseries data. Data collector 512 can identify a system or device associated with each of the data points. For example, data collector 512 can associate a data point with a temperature sensor, an air handler, a chiller, or any other type of system or device. In various embodiments, data collector uses the name of the data point, a range of values of the data point, statistical characteristics of the data point, or other attributes of the data point to identify a particular system or device associated with the data point. Data collector 512 can then determine how that system or device relates to the other systems or devices in the building site. For example, data collector 512 can determine that the identified system or device is part of a larger system (e.g., a HVAC system) or serves a particular space (e.g., a particular building, a room or zone of the building, etc.). In some embodiments, data collector 512 uses or creates an entity graph when organizing the timeseries data. An example of such an entity graph is described in greater detail with reference to FIG. 10A.

Data collector 512 can provide the raw timeseries data to data platform services 520 and/or store the raw timeseries data in local storage 514 or hosted storage 516. As shown in FIG. 5, local storage 514 can be data storage internal to BMS 500 (e.g., within memory 510) or other on-site data storage local to the building site at which the data samples are collected. Hosted storage 516 can include a remote database, cloud-based data hosting, or other remote data storage. For example, hosted storage 516 can include remote data storage located off-site relative to the building site at which the data samples are collected. Local storage 514 and hosted storage 516 can be configured to store the raw timeseries data obtained by data collector 512, the optimized timeseries data generated by data platform services 520, and/or directed acyclic graphs (DAGs) used by data platform services 520 to process the timeseries data.

Still referring to FIG. 5, BMS 500 is shown to include data platform services 520. Data platform services 520 can receive the raw timeseries data from data collector 512 and/or retrieve the raw timeseries data from local storage 514 or hosted storage 516. Data platform services 520 can include a variety of services configured to analyze, process, and transform the raw timeseries data. For example, data platform services 520 are shown to include a security service 522, an analytics service 524, an entity service 526, and a timeseries service 528. Security service 522 can assign security attributes to the raw timeseries data to ensure that the timeseries data are only accessible to authorized individuals, systems, or applications. Entity service 524 can assign entity information to the timeseries data to associate data points with a particular system, device, or space. Timeseries service 528 and analytics service 524 can apply various transformations, operations, or other functions to the raw timeseries data to generate optimized timeseries data.

In some embodiments, timeseries service 528 aggregates predefined intervals of the raw timeseries data (e.g., quarter-hourly intervals, hourly intervals, daily intervals, monthly intervals, etc.) to generate new optimized timeseries of the aggregated values. These optimized timeseries can be referred to as "data rollups" since they are condensed versions of the raw timeseries data. The data rollups generated by timeseries service 528 provide an efficient mechanism for applications 530 to query the timeseries data. For example, applications 530 can construct visualizations of the timeseries data (e.g., charts, graphs, etc.) using the pre-aggregated data rollups instead of the raw timeseries data. This allows applications 530 to simply retrieve and present the pre-aggregated data rollups without requiring applications 530 to perform an aggregation in response to the query. Since the data rollups are pre-aggregated, applications 530 can present the data rollups quickly and efficiently without requiring additional processing at query time to generate aggregated timeseries values.

In some embodiments, timeseries service 528 calculates virtual points based on the raw timeseries data and/or the optimized timeseries data. Virtual points can be calculated by applying any of a variety of mathematical operations (e.g., addition, subtraction, multiplication, division, etc.) or functions (e.g., average value, maximum value, minimum value, thermodynamic functions, linear functions, nonlinear functions, etc.) to the actual data points represented by the timeseries data. For example, timeseries service 528 can calculate a virtual data point (pointID$_3$) by adding two or more actual data points (pointID$_1$ and pointID$_2$) (e.g., pointID$_3$=pointID$_1$+pointID$_2$). As another example, timeseries service 528 can calculate an enthalpy data point (pointID$_4$) based on a measured temperature data point (pointID$_5$) and a measured pressure data point (pointID$_6$) (e.g., pointID$_4$=enthalpy(pointID$_5$, pointID$_6$)). The virtual data points can be stored as optimized timeseries data.

Applications 530 can access and use the virtual data points in the same manner as the actual data points. Applications 530 do not need to know whether a data point is an actual data point or a virtual data point since both types of data points can be stored as optimized timeseries data and can be handled in the same manner by applications 530. In some embodiments, the optimized timeseries are stored with attributes designating each data point as either a virtual data point or an actual data point. Such attributes allow applications 530 to identify whether a given timeseries represents a virtual data point or an actual data point, even though both types of data points can be handled in the same manner by applications 530. These and other features of timeseries service 528 are described in greater detail with reference to FIG. 6.

In some embodiments, analytics service 524 analyzes the raw timeseries data and/or the optimized timeseries data to detect faults. Analytics service 524 can apply a set of fault detection rules to the timeseries data to determine whether a fault is detected at each interval of the timeseries. Fault detections can be stored as optimized timeseries data. For example, analytics service 524 can generate a new fault detection timeseries with data values that indicate whether a fault was detected at each interval of the timeseries. An example of such a fault detection timeseries is described in greater detail with reference to FIG. 9B. The fault detection timeseries can be stored as optimized timeseries data along with the raw timeseries data in local storage 514 or hosted storage 516.

Still referring to FIG. 5, BMS 500 is shown to include several applications 530 including an energy management application 532, monitoring and reporting applications 534, and enterprise control applications 536. Although only a few applications 530 are shown, it is contemplated that applications 530 can include any of a variety of applications configured to use the optimized timeseries generated by data platform services 520. In some embodiments, applications 530 exist as a separate layer of BMS 500 (i.e., separate from data platform services 520 and data collector 512). This allows applications 530 to be isolated from the details of how the optimized timeseries are generated. In other embodiments, applications 530 can exist as remote applications that run on remote systems or devices (e.g., remote systems and applications 444, client devices 448).

Applications 530 can use the optimized timeseries data to perform a variety data visualization, monitoring, and/or control activities. For example, energy management application 532 and monitoring and reporting application 534 can use the optimized timeseries data to generate user interfaces (e.g., charts, graphs, etc.) that present the optimized timeseries data to a user. In some embodiments, the user interfaces present the raw timeseries data and the optimized data rollups in a single chart or graph. For example, a dropdown selector can be provided to allow a user to select the raw timeseries data or any of the data rollups for a given data point. Several examples of user interfaces that can be generated based on the optimized timeseries data are described in U.S. patent application Ser. No. 15/182,579 filed Jun. 14, 2016, and U.S. Provisional Patent Application No. 62/446,284 filed Jan. 13, 2017. The entire disclosures of both these patent applications are incorporated by reference herein.

Enterprise control application 536 can use the optimized timeseries data to perform various control activities. For example, enterprise control application 536 can use the optimized timeseries data as input to a control algorithm (e.g., a state-based algorithm, an extremum seeking control (ESC) algorithm, a proportional-integral (PI) control algorithm, a proportional-integral-derivative (PID) control algorithm, a model predictive control (MPC) algorithm, a feedback control algorithm, etc.) to generate control signals for building subsystems 428. In some embodiments, building subsystems 428 use the control signals to operate building equipment. Operating the building equipment can affect the measured or calculated values of the data samples provided to BMS 500. Accordingly, enterprise control application 536 can use the optimized timeseries data as feedback to control the systems and devices of building subsystems 428.

Timeseries Data Platform Service

Figure 6:
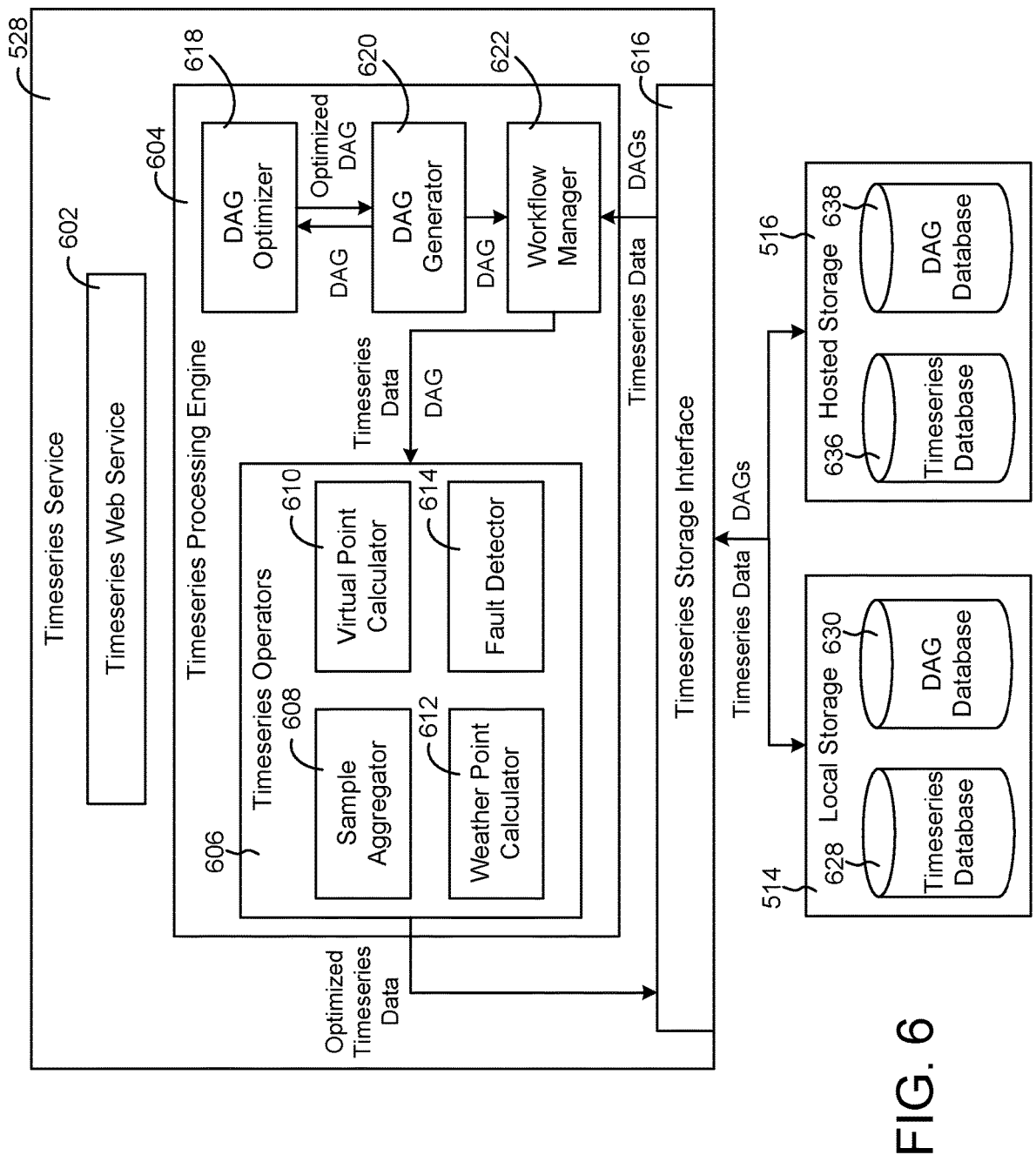
FIG. 6 is a block diagram of a timeseries service which can be implemented as some of the data platform services shown in FIG. 5, according to some embodiments.

Referring now to FIG. 6, a block diagram illustrating timeseries service 528 in greater detail is shown, according to some embodiments. Timeseries service 528 is shown to include a timeseries web service 602, a timeseries processing engine 604, and a timeseries storage interface 616. Timeseries web service 602 can be configured to interact with web-based applications to send and/or receive timeseries data. In some embodiments, timeseries web service 602 provides timeseries data to web-based applications. For example, if one or more of applications 530 are web-based applications, timeseries web service 602 can provide optimized timeseries data and raw timeseries data to the web-based applications. In some embodiments, timeseries web service 602 receives raw timeseries data from a web-based data collector. For example, if data collector 512 is a web-based application, timeseries web service 602 can receive data samples or raw timeseries data from data collector 512.

Timeseries storage interface 616 can be configured to store and read samples of various timeseries (e.g., raw timeseries data and optimized timeseries data). Timeseries storage interface 616 can interact with local storage 514 and/or hosted storage 516. For example, timeseries storage interface 616 can retrieve timeseries data from a local timeseries database 628 within local storage 514 or from a hosted timeseries database 636 within hosted storage 516. In some embodiments, timeseries storage interface 616 reads samples from a specified start time or start position in the timeseries to a specified stop time or a stop position in the timeseries. Timeseries storage interface 616 can also store timeseries data in local timeseries database 628 or hosted timeseries database 636. Advantageously, timeseries storage interface 616 provides a consistent interface which enables logical data independence.

In some embodiments, timeseries storage interface 616 stores timeseries as lists of data samples, organized by time. For example, timeseries storage interface 616 can store timeseries in the following format:

[<key,timestamp$_1$,value$_1$>, <key,timestamp$_2$,value$_2$>, <key, timestamp$_3$, value$_3$>]

where key is an identifier of the source of the data samples (e.g., timeseries ID, sensor ID, etc.), timestamp$_i$ identifies a time associated with the ith sample, and value$_i$ indicates the value of the ith sample.

In some embodiments, timeseries storage interface 616 stores timeseries in a tabular format. Timeseries storage interface 616 can store timeseries in various tables having a column for each attribute of the timeseries samples (e.g., key, timestamp, value). The tables can be stored in local timeseries database 628 and/or hosted timeseries database 636. In some embodiments, timeseries storage interface 616 caches older data to local timeseries database 628 or hosted timeseries database 636 but stores newer data in RAM. This may improve read performance when the newer data are requested for processing.

In some embodiments, timeseries storage interface 616 omits one or more of the attributes when storing the timeseries samples. For example, timeseries storage interface 616 may not need to repeatedly store the key or timeseries ID for each sample in the timeseries. In some embodiments, timeseries storage interface 616 omits timestamps from one or more of the samples. If samples of a particular timeseries have timestamps at regular intervals (e.g., one sample each minute), timeseries storage interface 616 can organize the samples by timestamps and store the values of the samples in a row. The timestamp of the first sample can be stored along with the interval between the timestamps. Timeseries storage interface 616 can determine the timestamp of any sample in the row based on the timestamp of the first sample and the position of the sample in the row.

In some embodiments, timeseries storage interface 616 stores one or more samples with an attribute indicating a change in value relative to the previous sample value. The change in value can replace the actual value of the sample when the sample is stored in local timeseries database 628 or hosted timeseries database 636. This allows timeseries storage interface 616 to use fewer bits when storing samples and their corresponding values. Timeseries storage interface 616 can determine the value of any sample based on the value of the first sample and the change in value of each successive sample.

In some embodiments, timeseries storage interface 616 creates containers or data objects in which samples of timeseries data can be stored. The containers can be JSON objects or other types of containers configured to store one or more timeseries samples. Timeseries storage interface 616 can be configured to add samples to the containers and read samples from the containers. For example, timeseries storage interface 616 can receive a set of samples from data collector 512, timeseries web service 602, and/or timeseries processing engine 604. Timeseries storage interface 616 can add the set of samples to a container and send the container to local storage 514 or hosted storage 516.

Timeseries storage interface 616 can use containers when reading samples from local storage 514 or hosted storage 516. For example, timeseries storage interface 616 can retrieve a set of samples from local storage 514 or hosted storage 516 and add the samples to a container. In some embodiments, the set of samples include all samples within a specified time period (e.g., samples with timestamps in the specified time period). Timeseries storage interface 616 can provide the container of samples to timeseries web service 602, timeseries processing engine 604, applications 530, and/or other components configured to use the timeseries samples.

Still referring to FIG. 6, timeseries processing engine 604 is shown to include several timeseries operators 606. Timeseries operators 606 can be configured to apply various operations, transformations, or functions to one or more input timeseries to generate output timeseries. The input timeseries can include raw timeseries data and/or optimized timeseries data. Timeseries operators 606 can be configured to calculate aggregate values, averages, or apply other mathematical operations to the input timeseries. In some embodiments, timeseries operators 606 generate virtual point timeseries by combining two or more input timeseries (e.g., adding the timeseries together), creating multiple output timeseries from a single input timeseries, or applying mathematical operations to the input timeseries. In some embodiments, timeseries operators 606 perform data cleansing operations or deduplication operations on an input timeseries. The output timeseries can be stored as optimized timeseries data in local storage 514 and/or hosted storage 516.

In some embodiments, timeseries operators 606 do not change or replace the raw timeseries data, but rather generate various "views" of the raw timeseries data. The views can be queried in the same manner as the raw timeseries data. For example, samples can be read from the raw timeseries data, transformed to create the view, and then provided as an output. Because the transformations used to create the views can be computationally expensive, the views can be stored as "materialized views" in local timeseries database 628 or hosted timeseries database 636. These materialized views are referred to as optimized timeseries data throughout the present disclosure.

Timeseries operators 606 can be configured to run at query time (e.g., when a request for optimized timeseries data is received) or prior to query time (e.g., when new raw data samples are received, in response to a defined event or trigger, etc.). This flexibility allows timeseries operators 606 to perform some or all of their operations ahead of time and/or in response to a request for specific optimized data timeseries. For example, timeseries operators 606 can be configured to pre-process one or more timeseries that are read frequently to ensure that the timeseries are updated whenever new data samples are received. However, timeseries operators 606 can be configured to wait until query time to process one or more timeseries that are read infrequently to avoid performing unnecessary processing operations.

In some embodiments, timeseries operators 606 are triggered in a particular sequence defined by a directed acyclic graph (DAG). The DAG may define a workflow or sequence of operations or transformations to apply to one or more input timeseries. For example, the DAG for a raw data timeseries may include a data cleansing operation, an aggregation operation, and a summation operation (e.g., adding two raw data timeseries to create a virtual point timeseries). The DAGs can be stored in a local DAG database 630 within local storage 514, in a hosted DAG database 638 within hosted storage 516, or internally within timeseries processing engine 604. DAGs can be retrieved by workflow manager 622 and used to determine how and when to process incoming data samples. Exemplary systems and methods for creating and using DAGs are described in greater detail below.

Timeseries operators 606 can perform aggregations for dashboards, cleansing operations, logical operations for rules and fault detection, machine learning predictions or classifications, call out to external services, or any of a variety of other operations which can be applied to timeseries data. The operations performed by timeseries operators 606 are not limited to sensor data. Timeseries operators 606 can also operate on event data or function as a billing engine for a consumption or tariff-based billing system.

Sample Aggregation

Still referring to FIG. 6, timeseries operators 606 are shown to include a sample aggregator 608. Sample aggregator 608 can be configured to generate optimized data rollups from the raw timeseries data. For each data point, sample aggregator 608 can aggregate a set of data values having timestamps within a predetermined time interval (e.g., a quarter-hour, an hour, a day, etc.) to generate an aggregate data value for the predetermined time interval. For example, the raw timeseries data for a particular data point may have a relatively short interval (e.g., one minute) between consecutive samples of the data point. Sample aggregator 608 can generate a data rollup from the raw timeseries data by aggregating all of the samples of the data point having timestamps within a relatively longer interval (e.g., a quarter-hour) into a single aggregated value that represents the longer interval.

For some types of timeseries, sample aggregator 608 performs the aggregation by averaging all of the samples of the data point having timestamps within the longer interval. Aggregation by averaging can be used to calculate aggregate values for timeseries of non-cumulative variables such as measured value. For other types of timeseries, sample aggregator 608 performs the aggregation by summing all of the samples of the data point having timestamps within the longer interval. Aggregation by summation can be used to calculate aggregate values for timeseries of cumulative variables such as the number of faults detected since the previous sample.

Figures 7A, 7B:
FIG. 7A is a block diagram illustrating an aggregation technique which can be used by the sample aggregator shown in FIG. 6 to aggregate raw data samples, according to some embodiments.
FIG. 7B is a data table which can be used to store raw data timeseries and a variety of optimized data timeseries which can be generated by the timeseries service of FIG. 6, according to some embodiments.

Referring now to FIGS. 7A-7B, a block diagram 700 and a data table 750 illustrating an aggregation technique which can be used by sample aggregator 608 is shown, according to some embodiments. In FIG. 7A, a data point 702 is shown. Data point 702 is an example of a measured data point for which timeseries values can be obtained. For example, data point 702 is shown as an outdoor air temperature point and has values which can be measured by a temperature sensor. Although a specific type of data point 702 is shown in FIG. 7A, it should be understood that data point 702 can be any type of measured or calculated data point. Timeseries values of data point 702 can be collected by data collector 512 and assembled into a raw data timeseries 704.

As shown in FIG. 7B, the raw data timeseries 704 includes a timeseries of data samples, each of which is shown as a separate row in data table 750. Each sample of raw data timeseries 704 is shown to include a timestamp and a data value. The timestamps of raw data timeseries 704 are ten minutes and one second apart, indicating that the sampling interval of raw data timeseries 704 is ten minutes and one second. For example, the timestamp of the first data sample is shown as 2015-12-31T23:10:00 indicating that the first data sample of raw data timeseries 704 was collected at 11:10:00 PM on Dec. 31, 2015. The timestamp of the second data sample is shown as 2015-12-31T23:20:01 indicating that the second data sample of raw data timeseries 704 was collected at 11:20:01 PM on Dec. 31, 2015. In some embodiments, the timestamps of raw data timeseries 704 are stored along with an offset relative to universal time, as previously described. The values of raw data timeseries 704 start at a value of 10 and increase by 10 with each sample. For example, the value of the second sample of raw data timeseries 704 is 20, the value of the third sample of raw data timeseries 704 is 30, etc.

In FIG. 7A, several data rollup timeseries 706-714 are shown. Data rollup timeseries 706-714 can be generated by sample aggregator 608 and stored as optimized timeseries data. The data rollup timeseries 706-714 include an average quarter-hour timeseries 706, an average hourly timeseries 708, an average daily timeseries 710, an average monthly timeseries 712, and an average yearly timeseries 714. Each of the data rollup timeseries 706-714 is dependent upon a parent timeseries. In some embodiments, the parent timeseries for each of the data rollup timeseries 706-714 is the timeseries with the next shortest duration between consecutive timeseries values. For example, the parent timeseries for average quarter-hour timeseries 706 is raw data timeseries 704. Similarly, the parent timeseries for average hourly timeseries 708 is average quarter-hour timeseries 706; the parent timeseries for average daily timeseries 710 is average hourly timeseries 708; the parent timeseries for average monthly timeseries 712 is average daily timeseries 710; and the parent timeseries for average yearly timeseries 714 is average monthly timeseries 712.

Sample aggregator 608 can generate each of the data rollup timeseries 706-714 from the timeseries values of the corresponding parent timeseries. For example, sample aggregator 608 can generate average quarter-hour timeseries 706 by aggregating all of the samples of data point 702 in raw data timeseries 704 that have timestamps within each quarter-hour. Similarly, sample aggregator 608 can generate average hourly timeseries 708 by aggregating all of the timeseries values of average quarter-hour timeseries 706 that have timestamps within each hour. Sample aggregator 608 can generate average daily timeseries 710 by aggregating all of the time series values of average hourly timeseries 708 that have timestamps within each day. Sample aggregator 608 can generate average monthly timeseries 712 by aggregating all of the time series values of average daily timeseries 710 that have timestamps within each month. Sample aggregator 608 can generate average yearly timeseries 714 by aggregating all of the time series values of average monthly timeseries 712 that have timestamps within each year.

In some embodiments, the timestamps for each sample in the data rollup timeseries 706-714 are the beginnings of the aggregation interval used to calculate the value of the sample. For example, the first data sample of average quarter-hour timeseries 706 is shown to include the timestamp 2015-12-31T23:00:00. This timestamp indicates that the first data sample of average quarter-hour timeseries 706 corresponds to an aggregation interval that begins at 11:00:00 PM on Dec. 31, 2015. Since only one data sample of raw data timeseries 704 occurs during this interval, the value of the first data sample of average quarter-hour timeseries 706 is the average of a single data value (i.e., average(10)=10). The same is true for the second data sample of average quarter-hour timeseries 706 (i.e., average (20)=20).

The third data sample of average quarter-hour timeseries 706 is shown to include the timestamp 2015-12-31T23:30:00. This timestamp indicates that the third data sample of average quarter-hour timeseries 706 corresponds to an aggregation interval that begins at 11:30:00 PM on Dec. 31, 2015. Since each aggregation interval of average quarter-hour timeseries 706 is a quarter-hour in duration, the end of the aggregation interval is 11:45:00 PM on Dec. 31, 2015. This aggregation interval includes two data samples of raw data timeseries 704 (i.e., the third raw data sample having a value of 30 and the fourth raw data sample having a value of 40). Sample aggregator 608 can calculate the value of the third sample of average quarter-hour timeseries 706 by averaging the values of the third raw data sample and the fourth raw data sample (i.e., average(30, 40)=35). Accordingly, the third sample of average quarter-hour timeseries 706 has a value of 35. Sample aggregator 608 can calculate the remaining values of average quarter-hour timeseries 706 in a similar manner.

Still referring to FIG. 7B, the first data sample of average hourly timeseries 708 is shown to include the timestamp 2015-12-31T23:00:00. This timestamp indicates that the first data sample of average hourly timeseries 708 corresponds to an aggregation interval that begins at 11:00:00 PM on Dec. 31, 2015. Since each aggregation interval of average hourly timeseries 708 is an hour in duration, the end of the aggregation interval is 12:00:00 AM on Jan. 1, 2016. This aggregation interval includes the first four samples of average quarter-hour timeseries 706. Sample aggregator 608 can calculate the value of the first sample of average hourly timeseries 708 by averaging the values of the first four values of average quarter-hour timeseries 706 (i.e., average (10, 20, 35, 50)=28.8). Accordingly, the first sample of average hourly timeseries 708 has a value of 28.8. Sample aggregator 608 can calculate the remaining values of average hourly timeseries 708 in a similar manner.

The first data sample of average daily timeseries 710 is shown to include the timestamp 2015-12-31T00:00:00. This timestamp indicates that the first data sample of average daily timeseries 710 corresponds to an aggregation interval that begins at 12:00:00 AM on Dec. 31, 2015. Since each aggregation interval of the average daily timeseries 710 is a day in duration, the end of the aggregation interval is 12:00:00 AM on Jan. 1, 2016. Only one data sample of average hourly timeseries 708 occurs during this interval. Accordingly, the value of the first data sample of average daily timeseries 710 is the average of a single data value (i.e., average(28.8)=28.8). The same is true for the second data sample of average daily timeseries 710 (i.e., average (87.5)=87.5).

In some embodiments, sample aggregator 608 stores each of the data rollup timeseries 706-714 in a single data table (e.g., data table 750) along with raw data timeseries 704. This allows applications 530 to retrieve all of the timeseries 704-714 quickly and efficiently by accessing a single data table. In other embodiments, sample aggregator 608 can store the various timeseries 704-714 in separate data tables which can be stored in the same data storage device (e.g., the same database) or distributed across multiple data storage devices. In some embodiments, sample aggregator 608 stores data timeseries 704-714 in a format other than a data table. For example, sample aggregator 608 can store timeseries 704-714 as vectors, as a matrix, as a list, or using any of a variety of other data storage formats.

In some embodiments, sample aggregator 608 automatically updates the data rollup timeseries 706-714 each time a new raw data sample is received. Updating the data rollup timeseries 706-714 can include recalculating the aggregated values based on the value and timestamp of the new raw data sample. When a new raw data sample is received, sample aggregator 608 can determine whether the timestamp of the new raw data sample is within any of the aggregation intervals for the samples of the data rollup timeseries 706-714. For example, if a new raw data sample is received with a timestamp of 2016-01-01T00:52:00, sample aggregator 608 can determine that the new raw data sample occurs within the aggregation interval beginning at timestamp 2016-01-01T00:45:00 for average quarter-hour timeseries 706. Sample aggregator 608 can use the value of the new raw data point (e.g., value=120) to update the aggregated value of the final data sample of average quarter-hour timeseries 706 (i.e., average(110, 120)=115).

If the new raw data sample has a timestamp that does not occur within any of the previous aggregation intervals, sample aggregator 608 can create a new data sample in average quarter-hour timeseries 706. The new data sample in average quarter-hour timeseries 706 can have a new data timestamp defining the beginning of an aggregation interval that includes the timestamp of the new raw data sample. For example, if the new raw data sample has a timestamp of 2016-01-01T01:00:11, sample aggregator 608 can determine that the new raw data sample does not occur within any of the aggregation intervals previously established for average quarter-hour timeseries 706. Sample aggregator 608 can generate a new data sample in average quarter-hour timeseries 706 with the timestamp 2016-01-01T01:00:00 and can calculate the value of the new data sample in average quarter-hour timeseries 706 based on the value of the new raw data sample, as previously described.

Sample aggregator 608 can update the values of the remaining data rollup timeseries 708-714 in a similar manner. For example, sample aggregator 608 determine whether the timestamp of the updated data sample in average quarter-hour timeseries is within any of the aggregation intervals for the samples of average hourly timeseries 708. Sample aggregator 608 can determine that the timestamp 2016-01-01T00:45:00 occurs within the aggregation interval beginning at timestamp 2016-01-01T00:00:00 for average hourly timeseries 708. Sample aggregator 608 can use the updated value of the final data sample of average quarter-hour timeseries 706 (e.g., value=115) to update the value of the second sample of average hourly timeseries 708 (i.e., average(65, 80, 95, 115)=88.75). Sample aggregator 608 can use the updated value of the final data sample of average hourly timeseries 708 to update the final sample of average daily timeseries 710 using the same technique.

In some embodiments, sample aggregator 608 updates the aggregated data values of data rollup timeseries 706-714 each time a new raw data sample is received. Updating each time a new raw data sample is received ensures that the data rollup timeseries 706-714 always reflect the most recent data samples. In other embodiments, sample aggregator 608 updates the aggregated data values of data rollup timeseries 706-714 periodically at predetermined update intervals (e.g., hourly, daily, etc.) using a batch update technique. Updating periodically can be more efficient and require less data processing than updating each time a new data sample is received, but can result in aggregated data values that are not always updated to reflect the most recent data samples.

In some embodiments, sample aggregator 608 is configured to cleanse raw data timeseries 704. Cleansing raw data timeseries 704 can include discarding exceptionally high or low data. For example, sample aggregator 608 can identify a minimum expected data value and a maximum expected data value for raw data timeseries 704. Sample aggregator 608 can discard data values outside this range as bad data. In some embodiments, the minimum and maximum expected values are based on attributes of the data point represented by the timeseries. For example, data point 702 represents a measured outdoor air temperature and therefore has an expected value within a range of reasonable outdoor air temperature values for a given geographic location (e.g., between −20° F. and 110° F.). Sample aggregator 608 can discard a data value of 330 for data point 702 since a temperature value of 330° F. is not reasonable for a measured outdoor air temperature.

In some embodiments, sample aggregator 608 identifies a maximum rate at which a data point can change between consecutive data samples. The maximum rate of change can be based on physical principles (e.g., heat transfer principles), weather patterns, or other parameters that limit the maximum rate of change of a particular data point. For example, data point 702 represents a measured outdoor air temperature and therefore can be constrained to have a rate of change less than a maximum reasonable rate of change for outdoor temperature (e.g., five degrees per minute). If two consecutive data samples of the raw data timeseries 704 have values that would require the outdoor air temperature to change at a rate in excess of the maximum expected rate of change, sample aggregator 608 can discard one or both of the data samples as bad data.

Sample aggregator 608 can perform any of a variety of data cleansing operations to identify and discard bad data samples. Several examples of data cleansing operations which can be performed by sample aggregator 608 are described in U.S. patent application Ser. No. 13/631,301 filed Sep. 28, 2012, the entire disclosure of which is incorporated by reference herein. In some embodiments, sample aggregator 608 performs the data cleansing operations for raw data timeseries 704 before generating the data rollup timeseries 706-714. This ensures that raw data timeseries 704 used to generate data rollup timeseries 706-714 does not include any bad data samples. Accordingly, the data rollup timeseries 706-714 do not need to be re-cleansed after the aggregation is performed.

Virtual Points

Referring again to FIG. 6, timeseries operators 606 are shown to include a virtual point calculator 610. Virtual point calculator 610 is configured to create virtual data points and calculate timeseries values for the virtual data points. A virtual data point is a type of calculated data point derived from one or more actual data points. In some embodiments, actual data points are measured data points, whereas virtual data points are calculated data points. Virtual data points can be used as substitutes for actual sensor data when the sensor data desired for a particular application does not exist, but can be calculated from one or more actual data points. For example, a virtual data point representing the enthalpy of a refrigerant can be calculated using actual data points measuring the temperature and pressure of the refrigerant. Virtual data points can also be used to provide timeseries values for calculated quantities such as efficiency, coefficient of performance, and other variables that cannot be directly measured.

Virtual point calculator 610 can calculate virtual data points by applying any of a variety of mathematical operations or functions to actual data points or other virtual data points. For example, virtual point calculator 610 can calculate a virtual data point ($pointID_3$) by adding two or more actual data points ($pointID_1$ and $pointID_2$) (e.g., $pointID_3 = pointID_1 + pointID_2$). As another example, virtual point calculator 610 can calculate an enthalpy data point ($pointID_4$) based on a measured temperature data point ($pointID_5$) and a measured pressure data point ($pointID_6$) (e.g., $pointID_4 = enthalpy(pointID_5, pointID_6)$). In some instances, a virtual data point can be derived from a single actual data point. For example, virtual point calculator 610 can calculate a saturation temperature ($pointID_7$) of a known refrigerant based on a measured refrigerant pressure ($pointID_8$) (e.g., $pointID_7 = T_{sat}(pointID_8)$). In general, virtual point calculator 610 can calculate the timeseries values of a virtual data point using the timeseries values of one or more actual data points and/or the timeseries values of one or more other virtual data points.

In some embodiments, virtual point calculator 610 uses a set of virtual point rules to calculate the virtual data points. The virtual point rules can define one or more input data points (e.g., actual or virtual data points) and the mathematical operations that should be applied to the input data point(s) to calculate each virtual data point. The virtual point rules can be provided by a user, received from an external system or device, and/or stored in memory 510. Virtual point calculator 610 can apply the set of virtual point rules to the timeseries values of the input data points to calculate timeseries values for the virtual data points. The timeseries values for the virtual data points can be stored as optimized timeseries data in local timeseries database 628 and/or hosted timeseries database 636.

Virtual point calculator 610 can calculate virtual data points using the values of raw data timeseries 704 and/or the aggregated values of the data rollup timeseries 706-714. In some embodiments, the input data points used to calculate a virtual data point are collected at different sampling times and/or sampling rates. Accordingly, the samples of the input data points may not be synchronized with each other, which can lead to ambiguity in which samples of the input data points should be used to calculate the virtual data point. Using the data rollup timeseries 706-714 to calculate the virtual data points ensures that the timestamps of the input data points are synchronized and eliminates any ambiguity in which data samples should be used.

Referring now to FIG. 8, several timeseries 800, 820, 840, and 860 illustrating the synchronization of data samples resulting from aggregating the raw timeseries data are shown, according to some embodiments. Timeseries 800 and 820 are raw data timeseries. Raw data timeseries 800 has several raw data samples 802-810. Raw data sample 802 is collected at time $t_1$; raw data sample 804 is collected at time $t_2$; raw data sample 806 is collected at time $t_3$; raw data sample 808 is collected at time $t_4$; raw data sample 810 is collected at time $t_5$; and raw data sample 812 is collected at time $t_6$.

Raw data timeseries 820 also has several raw data samples 822, 824, 826, 828, and 830. However, raw data samples, 822-830 are not synchronized with raw data samples 802-812. For example, raw data sample 822 is collected before time $t_1$; raw data sample 824 is collected between times $t_2$ and $t_3$; raw data sample 826 is collected between times $t_3$ and $t_4$; raw data sample 828 is collected between times $t_4$ and $t_5$; and raw data sample 830 is collected between times $t_5$ and $t_6$. The lack of synchronization between data samples 802-812 and raw data samples 822-830 can lead to ambiguity in which of the data samples should be used together to calculate a virtual data point.

Timeseries 840 and 860 are data rollup timeseries. Data rollup timeseries 840 can be generated by sample aggregator 608 by aggregating raw data timeseries 800. Similarly, data rollup timeseries 860 can be generated by sample aggregator 608 by aggregating raw data timeseries 820. Both raw data timeseries 800 and 820 can be aggregated using the same aggregation interval. Accordingly, the resulting data rollup timeseries 840 and 860 have synchronized data samples. For example, aggregated data sample 842 is synchronized with aggregated data sample 862 at time $t_{1'}$. Similarly, aggregated data sample 844 is synchronized with aggregated data sample 864 at time $t_{2'}$; aggregated data sample 846 is synchronized with aggregated data sample 866 at time $t_{3'}$; and aggregated data sample 848 is synchronized with aggregated data sample 868 at time $t_{4'}$.

The synchronization of data samples in data rollup timeseries 840 and 860 allows virtual point calculator 610 to readily identify which of the data samples should be used together to calculate a virtual point. For example, virtual point calculator 610 can identify which of the samples of data rollup timeseries 840 and 860 have the same timestamp (e.g., data samples 842 and 862, data samples 844 and 864, etc.). Virtual point calculator 610 can use two or more aggregated data samples with the same timestamp to calculate a timeseries value of the virtual data point. In some embodiments, virtual point calculator 610 assigns the shared timestamp of the input data samples to the timeseries value of the virtual data point calculated from the input data samples.

Weather Points

Referring again to FIG. 6, timeseries operators 606 are shown to include a weather point calculator 612. Weather point calculator 612 is configured to perform weather-based calculations using the timeseries data. In some embodiments, weather point calculator 612 creates virtual data points for weather-related variables such as cooling degree days (CDD), heating degree days (HDD), cooling energy days (CED), heating energy days (HED), and normalized energy consumption. The timeseries values of the virtual data points calculated by weather point calculator 612 can be stored as optimized timeseries data in local timeseries database 628 and/or hosted timeseries database 636.

Weather point calculator 612 can calculate CDD by integrating the positive temperature difference between the time-varying outdoor air temperature $T_{OA}$ and the cooling balance point $T_{bC}$ for the building as shown in the following equation:

$$CDD = \int^{period} \max\{0, (T_{OA} - T_{bC})\} dt$$

where period is the integration period. In some embodiments, the outdoor air temperature $T_{OA}$ is a measured data point, whereas the cooling balance point $T_{bC}$ is a stored parameter. To calculate CDD for each sample of the outdoor air temperature $T_{OA}$, weather point calculator 612 can multiply the quantity $\max\{0, (T_{OA} - T_{bC})\}$ by the sampling period $\Delta t$ of the outdoor air temperature $T_{OA}$. Weather point calculator 612 can calculate CED in a similar manner using outdoor air enthalpy $E_{OA}$ instead of outdoor air temperature $T_{OA}$. Outdoor air enthalpy $E_{OA}$ can be a measured or virtual data point.

Weather point calculator 612 can calculate HDD by integrating the positive temperature difference between a heating balance point $T_{bH}$ for the building and the time-varying outdoor air temperature $T_{OA}$ as shown in the following equation:

$$HDD = \int^{period} \max\{0, (T_{bH} - T_{OA})\} dt$$

where period is the integration period. In some embodiments, the outdoor air temperature $T_{OA}$ is a measured data point, whereas the heating balance point $T_{bH}$ is a stored parameter. To calculate HDD for each sample of the outdoor air temperature $T_{OA}$, weather point calculator 612 can multiply the quantity $\max\{0, (T_{bH} - T_{OA})\}$ by the sampling period $\Delta t$ of the outdoor air temperature $T_{OA}$. Weather point calculator 612 can calculate HED in a similar manner using outdoor air enthalpy $E_{OA}$ instead of outdoor air temperature $T_{OA}$.

In some embodiments, both virtual point calculator 610 and weather point calculator 612 calculate timeseries values of virtual data points. Weather point calculator 612 can calculate timeseries values of virtual data points that depend on weather-related variables (e.g., outdoor air temperature, outdoor air enthalpy, outdoor air humidity, outdoor light intensity, precipitation, wind speed, etc.). Virtual point calculator 610 can calculate timeseries values of virtual data points that depend on other types of variables (e.g., non-weather-related variables). Although only a few weather-related variables are described in detail here, it is contemplated that weather point calculator 612 can calculate virtual data points for any weather-related variable. The weather-related data points used by weather point calculator 612 can be received as timeseries data from various weather sensors and/or from a weather service.

Fault Detection

Still referring to FIG. 6, timeseries operators 606 are shown to include a fault detector 614. Fault detector 614 can be configured to detect faults in timeseries data. In some embodiments, fault detector 614 performs fault detection for timeseries data representing meter data (e.g., measurements from a sensor) and/or for other types of timeseries data. Fault detector 614 can detect faults in the raw timeseries data and/or the optimized timeseries data. In some embodiments, fault detector 614 receives fault detection rules from analytics service 524. Fault detection rules can be defined by a user (e.g., via a rules editor) or received from an external system or device. In various embodiments, the fault detection rules can be stored within local storage 514 and/or hosted storage 516. Fault detector 614 can retrieve the fault detection rules from local storage 514 or hosted storage 516 and can use the fault detection rules to analyze the timeseries data.

In some embodiments, the fault detection rules provide criteria that can be evaluated by fault detector 614 to detect faults in the timeseries data. For example, the fault detection rules can define a fault as a data value above or below a threshold value. As another example, the fault detection rules can define a fault as a data value outside a predetermined range of values. The threshold value and predetermined range of values can be based on the type of timeseries data (e.g., meter data, calculated data, etc.), the type of variable represented by the timeseries data (e.g., temperature, humidity, energy consumption, etc.), the system or device that measures or provides the timeseries data (e.g., a temperature sensor, a humidity sensor, a chiller, etc.), and/or other attributes of the timeseries data.

Fault detector 614 can apply the fault detection rules to the timeseries data to determine whether each sample of the timeseries data qualifies as a fault. In some embodiments, fault detector 614 generates a fault detection timeseries containing the results of the fault detection. The fault detection timeseries can include a set of timeseries values, each of which corresponds to a data sample of the timeseries data evaluated by fault detector 614. In some embodiments, each timeseries value in the fault detection timeseries includes a timestamp and a fault detection value. The timestamp can be the same as the timestamp of the corresponding data sample of the data timeseries. The fault detection value can indicate whether the corresponding data sample of the data timeseries qualifies as a fault. For example, the fault detection value can have a value of "Fault" if a fault is detected and a value of "Not in Fault" if a fault is not detected in the corresponding data sample of the data timeseries. The fault detection timeseries can be stored in local timeseries database 628 and/or hosted timeseries database 636 along with the raw timeseries data and the optimized timeseries data.

Referring now to FIGS. 9A-9B, a block diagram and data table 900 illustrating the fault detection timeseries is shown, according to some embodiments. In FIG. 9A, fault detector 614 is shown receiving a data timeseries 902 from local storage 514 or hosted storage 516. Data timeseries 902 can be a raw data timeseries or an optimized data timeseries. In some embodiments, data timeseries 902 is a timeseries of values of an actual data point (e.g., a measured temperature). In other embodiments, data timeseries 902 is a timeseries of values of a virtual data point (e.g., a calculated efficiency). As shown in table 900, data timeseries 902 includes a set of data samples. Each data sample includes a timestamp and a value. Most of the data samples have values within the range of 65-66. However, three of the data samples have values of 42.

Fault detector 614 can evaluate data timeseries 902 using a set of fault detection rules to detect faults in data timeseries 902. In some embodiments, fault detector 614 determines that the data samples having values of 42 qualify as faults according to the fault detection rules. Fault detector 614 can generate a fault detection timeseries 904 containing the results of the fault detection. As shown in table 900, fault detection timeseries 904 includes a set of data samples. Like data timeseries 902, each data sample of fault detection timeseries 904 includes a timestamp and a value. Most of the values of fault detection timeseries 904 are shown as "Not in Fault," indicating that no fault was detected for the corresponding sample of data timeseries 902 (i.e., the data sample with the same timestamp). However, three of the data samples in fault detection timeseries 904 have a value of "Fault," indicating that the corresponding sample of data timeseries 902 qualifies as a fault. As shown in FIG. 9A, fault detector 614 can store fault detection timeseries 904 in local storage 514 (e.g., in local timeseries database 628) and/or hosted storage 516 (e.g., in hosted timeseries database 636) along with the raw timeseries data and the optimized timeseries data.

Fault detection timeseries 904 can be used by BMS 500 to perform various fault detection, diagnostic, and/or control processes. In some embodiments, fault detection timeseries 904 is further processed by timeseries processing engine 604 to generate new timeseries derived from fault detection timeseries 904. For example, sample aggregator 608 can use fault detection timeseries 904 to generate a fault duration timeseries. Sample aggregator 608 can aggregate multiple consecutive data samples of fault detection timeseries 904 having the same data value into a single data sample. For example, sample aggregator 608 can aggregate the first two "Not in Fault" data samples of fault detection timeseries 904 into a single data sample representing a time period during which no fault was detected. Similarly, sample aggregator 608 can aggregate the final two "Fault" data samples of fault detection timeseries 904 into a single data sample representing a time period during which a fault was detected.

In some embodiments, each data sample in the fault duration timeseries has a fault occurrence time and a fault duration. The fault occurrence time can be indicated by the timestamp of the data sample in the fault duration timeseries. Sample aggregator 608 can set the timestamp of each data sample in the fault duration timeseries equal to the timestamp of the first data sample in the series of data samples in fault detection timeseries 904 which were aggregated to form the aggregated data sample. For example, if sample aggregator 608 aggregates the first two "Not in Fault" data samples of fault detection timeseries 904, sample aggregator 608 can set the timestamp of the aggregated data sample to 2015-12-31T23:10:00. Similarly, if sample aggregator 608 aggregates the final two "Fault" data samples of fault detection timeseries 904, sample aggregator 608 can set the timestamp of the aggregated data sample to 2015-12-31T23:50:00.

The fault duration can be indicated by the value of the data sample in the fault duration timeseries. Sample aggregator 608 can set the value of each data sample in the fault duration timeseries equal to the duration spanned by the consecutive data samples in fault detection timeseries 904 which were aggregated to form the aggregated data sample. Sample aggregator 608 can calculate the duration spanned by multiple consecutive data samples by subtracting the timestamp of the first data sample of fault detection timeseries 904 included in the aggregation from the timestamp of the next data sample of fault detection timeseries 904 after the data samples included in the aggregation.

For example, if sample aggregator 608 aggregates the first two "Not in Fault" data samples of fault detection timeseries 904, sample aggregator 608 can calculate the duration of the aggregated data sample by subtracting the timestamp 2015-12-31T23:10:00 (i.e., the timestamp of the first "Not in Fault" sample) from the timestamp 2015-12-31T23:30:00 (i.e., the timestamp of the first "Fault" sample after the consecutive "Not in Fault" samples) for an aggregated duration of twenty minutes. Similarly, if sample aggregator 608 aggregates the final two "Fault" data samples of fault detection timeseries 904, sample aggregator 608 can calculate the duration of the aggregated data sample by subtracting the timestamp 2015-12-31T23:50:00 (i.e., the timestamp of the first "Fault" sample included in the aggregation) from the timestamp 2016-01-01T00:10:00 (i.e., the timestamp of the first "Not in Fault" sample after the consecutive "Fault" samples) for an aggregated duration of twenty minutes.

Directed Acyclic Graphs

Referring again to FIG. 6, timeseries processing engine 604 is shown to include a directed acyclic graph (DAG) generator 620. DAG generator 620 can be configured to generate one or more DAGs for each raw data timeseries. Each DAG may define a workflow or sequence of operations which can be performed by timeseries operators 606 on the raw data timeseries. When new samples of the raw data timeseries are received, workflow manager 622 can retrieve the corresponding DAG and use the DAG to determine how the raw data timeseries should be processed. In some embodiments, the DAGs are declarative views which represent the sequence of operations applied to each raw data timeseries. The DAGs may be designed for timeseries rather than structured query language (SQL).

Referring now to FIG. 10A, an example of a DAG 1000 which can be created by DAG generator 620 is shown, according to an exemplary embodiment. DAG 1000 is shown as a structured tree representing a graph of the dataflow rather than a formal scripting language. Blocks 1002 and 1004 represent the input timeseries which can be specified by timeseries ID (e.g., ID 123, ID 456, etc.). Blocks 1006 and 1008 are functional blocks representing data cleansing operations. Similarly, block 1010 is a functional block representing a weekly rollup aggregation and block 1012 is a functional block representing an addition operation. Blocks 1014 and 1016 represent storage operations indicating where the output of DAG 1000 should be stored (e.g., local storage, hosted storage, etc.).

In DAG 1000, the arrows connecting blocks 1002-1016 represent the flow of data and indicate the sequence in which the operations defined by the functional blocks should be performed. For example, the cleansing operation represented by block 1006 will be the first operation performed on the timeseries represented by block 1002. The output of the cleansing operation in block 1006 will then be provided as an input to both the aggregation operation represented by block 1010 and the addition operation represented by block 1012. Similarly, the cleansing operation represented by block 1008 will be the first operation performed on the timeseries represented by block 1004. The output of the cleansing operation in block 1008 will then be provided as an input to the addition operation represented by block 1012.

In some embodiments, DAG 1000 can reference other DAGs as inputs. Timeseries processing engine 604 can stitch the DAGs together into larger groups. DAG 1000 can support both scalar operators (e.g., run this function on this sample at this timestamp) and aggregate window operators (e.g., apply this function over all the values in the timeseries from this time window). The time windows can be arbitrary and are not limited to fixed aggregation windows. Logical operators can be used to express rules and implement fault detection algorithms. In some embodiments, DAG 1000 supports user-defined functions and user-defined aggregates.

In some embodiments, DAG 1000 is created based on user input. A user can drag-and-drop various input blocks 1002-1004, functional blocks 1006-1012, and output blocks 1014-1016 into DAG 1000 and connect them with arrows to define a sequence of operations. The user can edit the operations to define various parameters of the operations.

For example, the user can define parameters such as upper and lower bounds for the data cleansing operations in blocks 1006-1008 and an aggregation interval for the aggregation operation in block 1010. DAG 1000 can be created and edited in a graphical drag-and-drop flow editor without requiring the user to write or edit any formal code. In some embodiments, DAG generator 620 is configured to automatically generate the formal code used by timeseries operators 606 based on DAG 1000.

Referring now to FIG. 10B, an example of code 1050 which can be generated by DAG generator 620 is shown, according to an exemplary embodiment. Code 1050 is shown as a collection of JSON objects 1052-1056 that represent the various operations defined by DAG 1000. Each JSON object corresponds to one of the functional blocks in DAG 1000 and specifies the inputs/sources, the computation, and the outputs of each block. For example, object 1052 corresponds to the cleansing operation represented by block 1006 and defines the input timeseries (i.e., "123_Raw"), the particular cleansing operation to be performed (i.e., "BoundsLimitingCleanseOP"), the parameters of the cleansing operation (i.e., "upperbound" and "lowerbound") and the outputs of the cleansing operation (i.e., "123_Cleanse" and "BLCleanseFlag").

Similarly, object 1054 corresponds to the aggregation operation represented by block 1010 and defines the input timeseries (i.e., "123_Cleanse"), the aggregation operation to be performed (i.e., "AggregateOP"), the parameter of the aggregation operation (i.e., "interval": "week") and the output of the aggregation operation (i.e., "123_WeeklyRollup"). Object 1056 corresponds to the addition operation represented by block 1012 and defines the input timeseries (i.e., "123_Cleanse" and "456_Cleanse"), the addition operation to be performed (i.e., "AddOP"), and the output of the addition operation (i.e., "123+456"). Although not specifically shown in FIG. 10B, code 1050 may include an object for each functional block in DAG 1000.

Advantageously, the declarative views defined by the DAGs provide a comprehensive view of the operations applied to various input timeseries. This provides flexibility to run the workflow defined by a DAG at query time (e.g., when a request for optimized timeseries data is received) or prior to query time (e.g., when new raw data samples are received, in response to a defined event or trigger, etc.). This flexibility allows timeseries processing engine 604 to perform some or all of their operations ahead of time and/or in response to a request for specific optimized data timeseries.

Referring again to FIG. 6, timeseries processing engine 604 is shown to include a DAG optimizer 618. DAG optimizer 618 can be configured to combine multiple DAGs or multiple steps of a DAG to improve the efficiency of the operations performed by timeseries operators 606. For example, suppose that a DAG has one functional block which adds "Timeseries A" and "Timeseries B" to create "Timeseries C" (i.e., A+B=C) and another functional block which adds "Timeseries C" and "Timeseries D" to create "Timeseries E" (i.e., C+D=E). DAG optimizer 618 can combine these two functional blocks into a single functional block which computes "Timeseries E" directly from "Timeseries A," "Timeseries B," and "Timeseries D" (i.e., E=A+B+D). Alternatively, both "Timeseries C" and "Timeseries E" can be computed in the same functional block to reduce the number of independent operations required to process the DAG.

In some embodiments, DAG optimizer 618 combines DAGs or steps of a DAG in response to a determination that multiple DAGs or steps of a DAG will use similar inputs. This allows the inputs to be retrieved and loaded once rather than performing two separate operations that both load the same inputs. In some embodiments, DAG optimizer 618 schedules timeseries operators 606 to nodes where data is resident in memory in order to further reduce the amount of data required to be loaded from timeseries databases 628 and 636.

Distributed Agent Development Framework

A building management system may include multiple IoT and/or BMS devices, but these devices often only communicate with a centralized server, such as a cloud-based server or service. This can make it difficult for the devices to work together to accomplish specific goals and tasks, as all communication must first pass through the cloud-based service. In order to facilitate collaboration between the IoT devices, for example, applications may create data warehouse-like structures to filter and distribute the information to the IoT devices. This can result in complex deployment and challenges in edge computing and/or hybrid computing. The below described embodiments provide an advantage over current IoT systems by created a distributed agent development framework. This distributed agent-development framework can utilize channels to allow for communication between multiple IoT devices in an IoT environment, thereby allowing for improved collaboration among the IoT devices.

Figure 11:
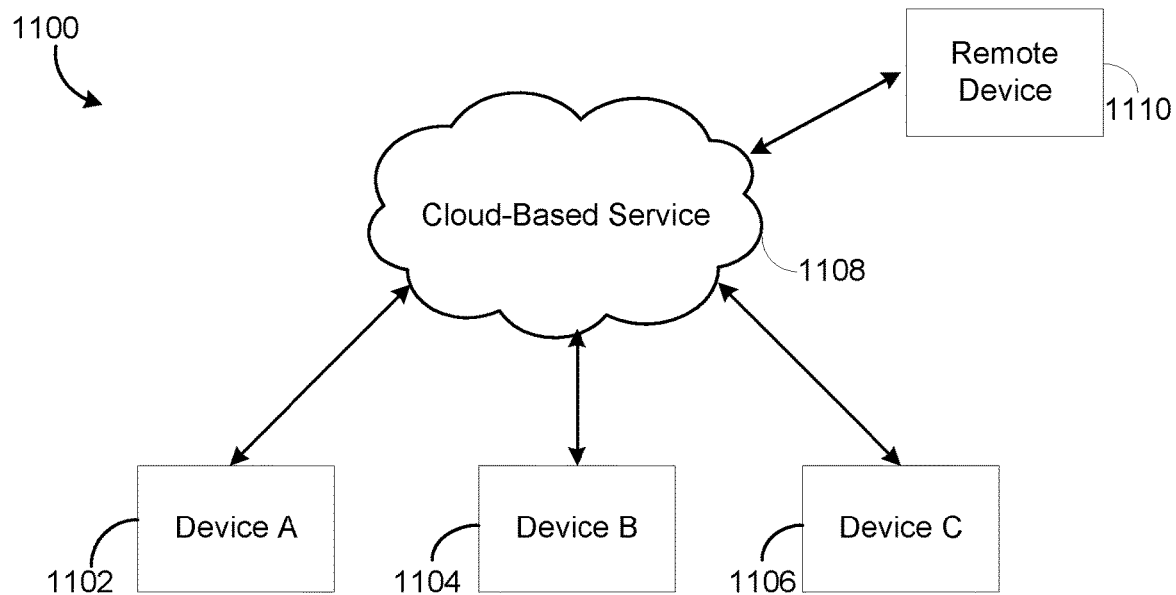
FIG. 11 is a block diagram illustrating a silo configured IoT environment, according to some embodiments.

FIG. 11 is a block diagram illustrating a silo-configured IoT environment 1100, according to some embodiments. The IoT environment 1100 may include a plurality of devices 1102, 1104, 1106, a cloud-based service 1108, and a remote device 1110. While only three devices 1102, 1104, 1106 are shown in FIG. 11, it is contemplated that the silo configured IoT environment 1100 may include more than three devices or fewer than three devices, as needed. The devices 1102, 1104, 1106 may be any type of BMS device, such as those described above. For example, the devices 1102, 1104, 1106 can be sensors, controllers, actuators, sub-systems, thermostats, or any other component within the BMS system capable of communicating to the cloud-based service 1108. In one embodiment, the devices 1102, 1104, 1106 may be connected directly to the cloud-based service 1108 via an internet-based connection. For example, the devices 1102, 1104, 1106 may be connected to the cloud-based service 1108 via a wireless connection such as Wi-Fi. In some embodiments, the devices 1102, 1104, 1106 are connected to the Internet via one or more gateways, routers, modems, or other internet connected devices, which provide communication to and from the internet. In some examples, the devices 1102, 1104, 1106 may be configured to communicate directly to the internet. The devices 1102, 1104, 1106 may include wireless transmitters, such as cellular transmitters (3G, 4G, LTE, CDMA, etc.), that allow the devices 1102, 1104, 1106 to connect to the internet directly via one or more service providers.

As shown in FIG. 11, the devices communicate directly to the cloud-based service 1108. The cloud-based service 1108 may be one or more services provided by a remote server (e.g. the cloud). In one embodiment, the cloud-based service can be a unified management and processing service, as will be described in more detail below. In other embodiments, the cloud-based service 1108 may be a timeseries service, as described above. The remote device 1110 may be one or more devices configured to access the cloud-based service 1108. In one of the embodiments, the remote device 1110 is a remote computer, such as a Personal Computer (PC). In other embodiments, the remote device 1110 is a mobile device such as a smartphone (Apple iPhone, Android Phone, Windows Phone, etc.), a tablet computer (Apple iPad, Microsoft Surface, Android tablet, etc.). In still further embodiments, the remote device 1110 may be a dedicated device, such as a commissioning tool. In one embodiment, the remote device 1110 is configured to communicate with the one or more cloud-based services 1108. The remote device 1110 may be configured to allow a user to access the cloud-based services 1108. In some embodiments, a user may be able to request certain actions be performed from the cloud-based service 1108 via the remote device. For example, the remote device 1110 may be used to request certain reports and/or other data processed by the cloud-based services. In other embodiments, the remote device 1110 may be used to request information relating to one or more of the devices 1102, 1104, 1106 for analysis by the user. The remote device 1110 may be configured to access any functions of the cloud-based service 1108, for which the remote device 1110 has sufficient permissions.

Figure 12:
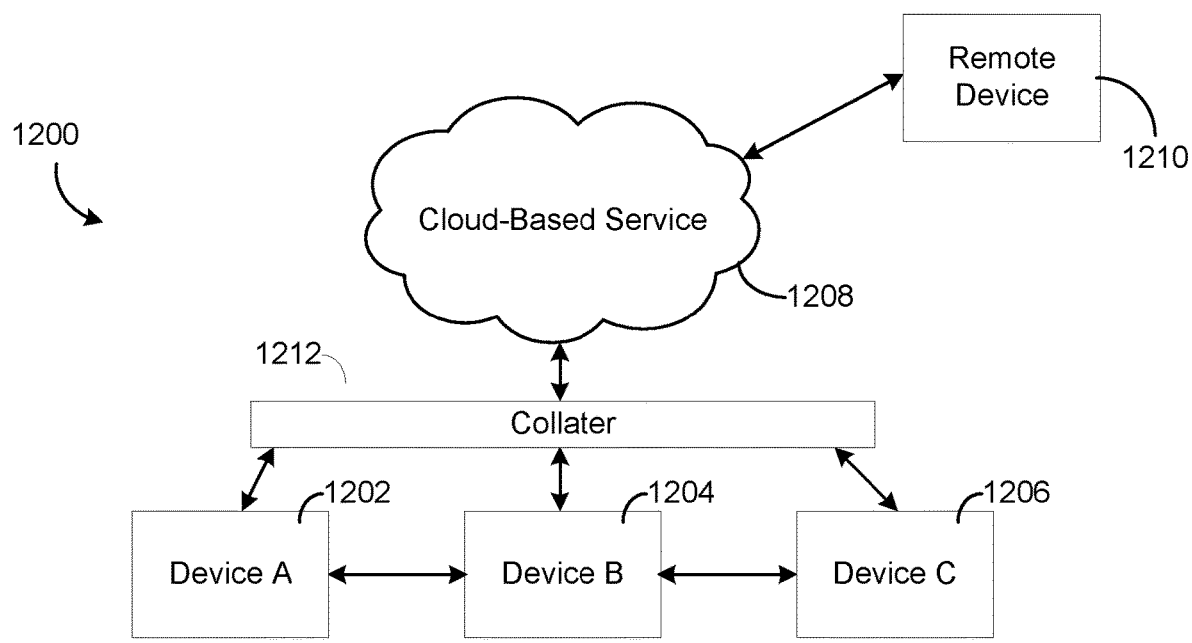
FIG. 12 is a block diagram illustrating a decentralized IoT environment, according to some embodiments.

FIG. 12 is a block diagram illustrating a de-centralized IoT environment 1200, according to some embodiments. Similar to environment 1100 described above, the environment 1200 includes a number of devices 1202, 1204, 1206. In one embodiment, the devices 1202, 1204, 1206 are similar to devices 1102, 1104, 1106 described above. The environment 1200 may further include a cloud-based service 1208 and a remote device 1210. The cloud-based service 1208 and the remote device 1210 may function as cloud-based service 1108 and remote device 1110 described above. The environment 1200 is further shown to include a collator 1212.

The devices 1202, 1204, 1206 may be configured to communicate between each other, or to the cloud-based service 1208 via the collator 1212. In one embodiment, the devices 1202, 1204, 1206 are configured to communicate with each other over a network, such as BACnet. However, other networks, such as local-area-networks (LAN), wide-area networks (WAN), TCP/IP or other networks are also included. In some embodiments, the devices 1202, 1204, 1206 may communicate with each other via a wireless protocol, such as Wi-Fi, LoRa, Cellular (3G, 4G, CDMA, LTE), Wi-Max, Bluetooth, Zigbee, etc. The devices 1202, 1204, 1206 may include one or more processors, such as a microprocessor capable of processing instructions. The devices 1202, 1204, 1206 may be configured to process data within each device 1202, 1204, 1206. The devices 1202, 1204, 1206 may further be configured to receive one or more instructions from the cloud-based service 1208. For example, the cloud-based service 1208 may instruct the devices 1202, 1204, 1206 to perform certain actions, or to provide specific data to the cloud-based service 1208. In some embodiments, the devices 1202, 1204, 1206 may receive the requests from the cloud-based service and communicate with each other to provide the requested service.

In some embodiments, the devices 1202, 1204, 1206 communicate with the cloud-based service 1208 via the collator 1212. The collator 1212 is configured to provide coordination between the devices 1202, 1204, 1206. In some embodiments, the collator 1212 may be a software element within a local device, such as an internet gateway (not shown). In other embodiments, the collator 1212 may be a service within the cloud-based services 1528. The collator 1212 may be configured to facilitate Edge computing between the devices 1202, 1204, 1206. For example, the collator 1212 may be configured to coordinate between the device 1202, 1204, 1206 to provide instructions to facilitate Edge computing (e.g. peer to peer or mesh computing). Further, the collator 1212 may serve to organize data received from multiple devices 1202, 1204, 1206. For example, the collator 1212 may be configured to provide the unified management and processing of IoT data described below.

In some embodiments, IoT devices, such as those described above may communicate with each other based on one or more channels. The IoT devices can subscribe to one or channels within the BMS. Channels may be associated with a zone, a system, a user or other attributes associated with a BMS. These channels can allow for IoT device to subscribe to all messages that are associated with the channel, i.e., receive published messages. In one example, software agents may be integrated into one or more of the IoT devices, and can create a dynamic messaging infrastructure. The dynamic messaging infrastructure can be created by mimicking social conversation and group behavior. Further, the dynamic messaging infrastructure can include multiple partitions, channels and topics to make communication among devices, via their agents, and people within the BMS.

Figure 13:
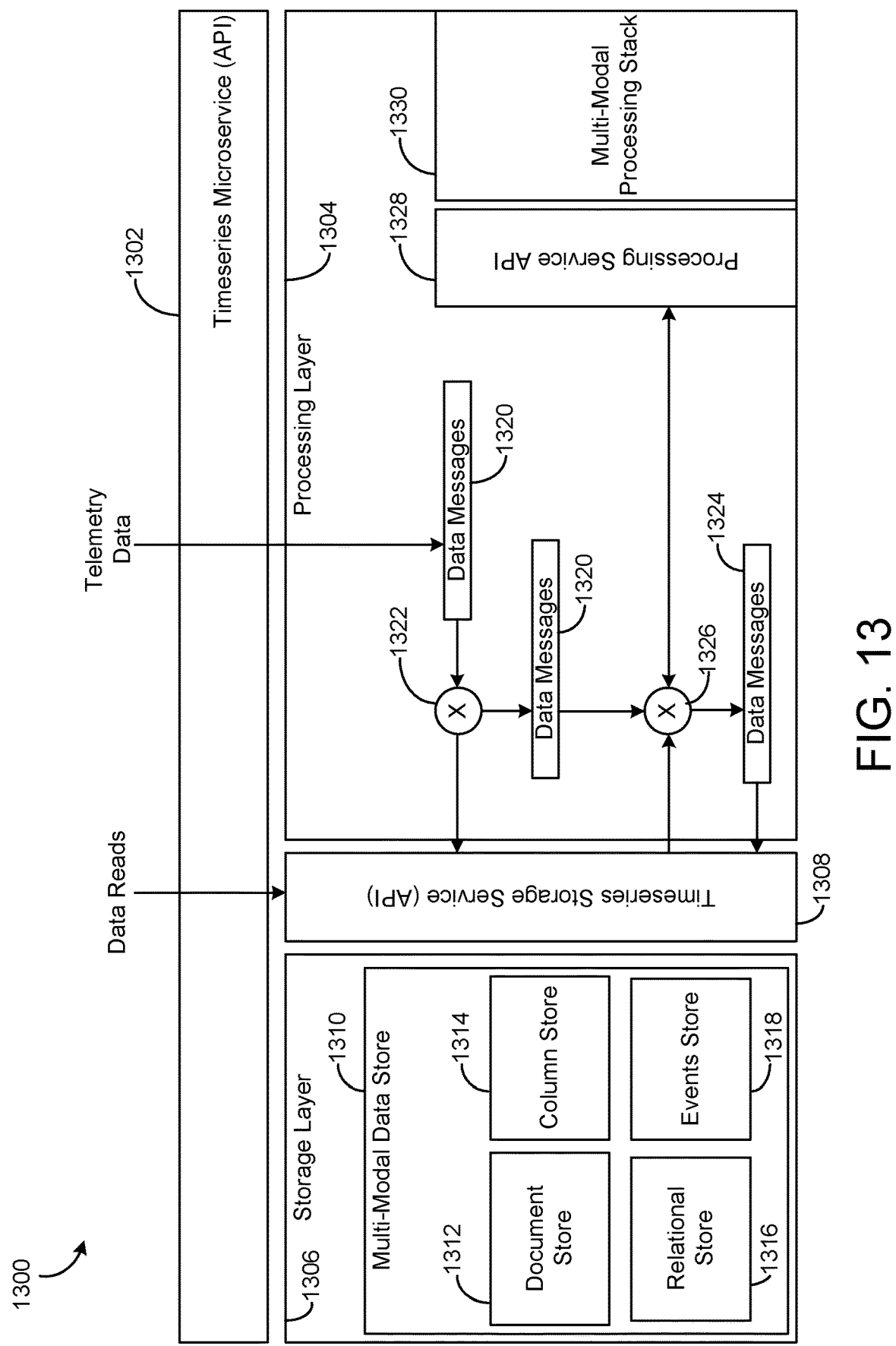
FIG. 13 is a block diagram illustrating a multi-modal data processing service, according to some embodiments.

Turning now to FIG. 13, a block diagram illustrating a multi-modal data processing service 1300 is shown, according to some embodiments. The multi-modal data processing service 1300 includes a timeseries microservice API 1302, a processing layer 1304 and a storage layer 1306. The timeseries microservice API 1302 may provide an interface between one or more devices, databases, controllers, or other source of data via the API. The timeseries microservice API 1302 may handle queries provided to the multi-modal data processing service 1300, which are then served directly from the storage layer 1306, ensuring low round-trip time (RTT). In some embodiments, the timeseries microservice API 1302 may route data to the proper layer within the multi-modal data processing service 1300 based on the type of data received. For example, telemetry data, or other data received from sensors or other devices may be routed to the processing layer 1304. In other examples, previously stored data, such as data received from databases or other data storage types may be provided to the storage layer 1306. In one embodiment, the previously stored data, or data reads, may be provided to the timeseries storage service API 1308 for processing into the storage layer 1306. In one embodiment, the timeseries storage service API 1308 is configured to parse the data reads to determine how the data reads should be stored within the storage layer 1306.

The storage layer 1306 may be configured to store multiple data types. In one embodiment, the storage layer 1306 includes a multi-modal data store 1310. The multi-modal data store 1310 may store the different multi-modal data types. For example, the multi-modal data store 1310 may include a document store 1312, a column store 1314, a relational store 1316 and an events store 1313. In some examples, the multi-modal data store 1310 may also include in-memory cache for quickly accessing recent items stored in a memory associated with the storage layer 1306 and/or the multi-modal data processing service 1300. The data associated with the document store 1312, the column store 1314, the relational store 1316 and the events store 1313 will be described in more detail below.

The processing layer 1304 may be configured to process one or more data messages 1320 received by the multi-modal data processing service 1300. data messages 1320 can include telemetry data from one or more sources, such as sensors, controllers, or other devices. The processing layer 1304 may receive one or more data messages 1320. Data messages 1320 may be unpacked at process element 1322. In one embodiment, the unpacked data is pushed to the storage layer 1306. The storage layer 1306 may analyze the unpacked data to determine if additional information may be required to process the data message 1320. The additional information may include metadata (e.g. device type, age, etc.), historical content tags (prior incidents of faults, service history, etc.) as well as the definitions of data aggregation and transformation operations that need to be performed on the data message 1320 for generating analytics. The definitions of data aggregation and transformation operations may include cleansing, filling, aggregations, windowing operations, etc. The additional data may be accessed from the multi-modal data store 1310. In one example, the additional data may be accessed from the multi-modal data store 1310 via the in-memory cache.

The data message 1320 is then combined with the additional information provided via the multi-modal data store 1310 to form enriched data message 1324. In one embodiment, the additional information is combined with the data message 1320 at processing element 1326. The processing layer 1304 may further include a processing service API 1328 and a multi-modal processing stack 1330. The processing service API 1328 is configured to access one or more processing engines within the multi-modal processing stack 1330 to allow for the enriched data message 1324 to be processes. Example processing engines may include Dot-Net/C# engines, Python engines, SparkSQL engines, GraphX Engines, MLlib Engines, MATLAB engines, etc. The multi-modal processing stack 1330 is configured to perform the required operations to process the enriched data message 1324. The multi-modal processing stack 1330 may further be able to generate metrics, such as transformed timeseries data, and other analytics. For example, the analytics may determine that a piece of equipment may be at a high risk of a safety shutdown within the next 24 hours. The metrics and analytics may then be stored in the storage layer 1306.

Dynamic Agent-Based Communication Channel Systems

The use of agents to aid in simulation of a building or system provide multiple advantages to BMS systems. For example, agent-based building simulation may allow for a single integrated system from design to commissioning to operations. Agent based building simulation also allows for heavy reuse of design inputs, as well as for ease of commissioning (e.g. such as by eliminating the need for explicit point binding.) Agents, such as space agents, equipment agents, and control agents may be used, and may allow for goal-oriented optimization within the BMS. Further, agents can be used to allow for agile deployment of new features (e.g. via the agents) when the BMS is in operations mode. The agents can be run on different devices within the system (e.g. on the devices with which the agents are associated, on local controllers, on a server or set of servers, in a cloud or distributed computing system, etc.) and can allow for system scalability without complexity (e.g. via agents forming building blocks.) Additionally, cloud replicas or virtual simulations of a building can allow for analytics and machine learning to be performed.

In some embodiments, an agent may be a self-contained piece of software. An agent may be configured to start with an initial state and thereafter may only receive or send information through messages, which will be described in more detail below. An agent may be responsible only for an assigned task (e.g. a VAV agent may only control the damper associated with the VAV). In some embodiments, logistical matters, such as authentication or assigning agents to channels may be handled by the system and not by the agent. However, in some embodiments, an agent may handle the logistical matters.

In one embodiment, an agent may be configured to build up a view of the outside of a building based on one or more received messages. The agent may further include an internal clock, thereby allowing the agent to perform tasks at regular intervals or trigger a scheduled event. Additionally, each agent may have its own unique identifier (e.g. address). In one embodiment, an agent is not limited to representing a single piece of HVAC equipment or a single physical location. The agent may be configured to represent any logical grouping needed (e.g. all AHU's and VAV's, or only thermostats associated with a walk-in freezer). This allows the agent to be configured to operate in multiple ways, based on the implementation.

In some embodiments, an agent may be an intelligent agent. Intelligent agents may be configured to have states and behaviors, as well as be configured to operate as a computation unit. In some embodiments, intelligent agents may be configured to sense their environments (e.g. the system or device into which they are installed), and evaluate potential operational options, as well as effect actions within the system or device. Intelligent agents may further be configured to function autonomously and can further be goal oriented (e.g. can work towards achieving specific goals). The intelligent agents can further be configured to interact with other agents and can work in a co-operative manner with other said agents. Additionally, intelligent agents can further learn from their behavior and the effect of the behaviors on the environment over time. The intelligent agents may be configured to perceive an environment with sensors or other inputs, and act on the perceived environment with effectors. The intelligent agents may further be configured to act upon perceived information, experiences, or own decisions.

In some embodiments, an agent is an equipment agent. Equipment agents may be associated with a specific device within a BMS. For example, a VAV may have an associated VAV agent. Further, other devices such as sensors, AHUs, Chillers, and RTUs may have associated agents as well. Each of the equipment agents may have access to the same inputs and outputs as the associated equipment does. Further, the equipment agents may be able to control and/or monitor multiple parameters of their associated equipment. Other agents, such as space agents, may be similar to equipment agents, but are associated with a space (e.g. building zone, room, floor, building, etc.), and not a particular piece of equipment. The space agents may be configured to monitor parameters associated with the space, as well as health of equipment that services the space. Further, the space agents may be configured to control the setpoints for the space and calculate effective setpoints accordingly. In some embodiments, a BMS may further include control agents, which may perform control functions within the BMS. Example control agents can include global data sharing agents, temporary occupancy override agents, scheduled exception agents, flow setpoint reset agents, optimal start/stop agents, reheat valve control agents, unoccupied mode night setback agents, chiller sequencing agents, and the like.

The agents described above generally communicate with each other, and with the BMS in general, using messages as described herein. Messages may be serialized pieces of data that are published to a channel. The channel may allow the message to be sent to all agents that are subscribed to the channel. In some embodiments, each message may contain a unique identifier and the identifier of the agent that published the message. As stated above, channels are the medium used by the agents to send and receive messages. An agent can publish (e.g. send) a message to a channel or receive a message from a channel to which the agent is subscribed. A message that is published to a channel is received by all subscribers to that channel, in some embodiments. A channel may contain any group of agents that communicate with each other. In some embodiments, passing messages through channels may be the only method of providing communication to and from agents. Further, the messaging infrastructure and the agents may be separate from each other. For example, the agents may be configured to not know their location, to not know other agents they are grouped with, and/or not know any other details of the messaging infrastructure. Likewise, the messaging infrastructure may not know anything about the agents other than which agent to send messages to. In some embodiments, internal messages (e.g. messages within the BMS) are formatted using a Haystack JSON encoding standard. A number of helper functions may be available for formatting simple message packets in a Haystack compatible manner and/or parse and extract specific portions of certain messages. Further, messages from an agent to a web-based user interface, and vice versa, may be serialized as JSON.

As an example, a channel may include a "Barn" channel, which has a Cat agent and a Farmer agent as publishers, and Cat, Mouse and Dog agents as subscribers. Thus, if the Cat agent sends a "meow" message, then the Cat agent, Mouse agent, and Dog agent will receive the message, but not the farmer. Note that the Cat agent receives its own message because it is both a publisher to, and a subscriber of, the Barn channel. If the Dog agent sends a "woof" message, no other agents will receive the message since the Dog agent is not a publisher on the Barn channel.

Embodiments may use any number of publish-subscribe messaging patterns, according to some embodiments. For example, an agent may publish a message onto the channel, and subscribers to the channel may receive the message, as discussed herein. As another example, an agent may publish a message, which is then received by a communication infrastructure system. The communication infrastructure system may be configured to parse the message for a specific aspect, such as a topic, an associated space, associated equipment, etc. The communication infrastructure can then determine which channel the message belongs on and provide the message to that channel. Example communication infrastructures may utilize decoupling and asynchronous delivery, as well as multiway delivery.

In some embodiments, message passing may be implemented via a Redis Pub/Sub system. In Redis Pub/Sub semantics, an agent or function may publish on any channel arbitrarily simply by calling the PUBLISH command and specifying the name of a channel. Furthermore, abstraction provides agents with no (direct) control over which channels they communicate on. However, exceptions can be configured using the link property of an agent's configuration. In general, all messages and agent output are published on all the channels on which the agent publishes to, according to the semantics described above. A similar process may be used to decide which messages an agent should receive.

As described herein, messages may be dispatched synchronously or asynchronously. In a synchronous system, the messages are transmitted to a channel, dispatched to agents which subscribe to the channel, and republishing any responses if they are provided. In an asynchronous system, the messages may be injected into the system by publishing properly formatted messages to the correct Redis channel. By performing this process asynchronously, the architecture can be leveraged to demonstrate concurrent/parallel interaction using add-ons or other extensions to a given configuration.

Figure 14:
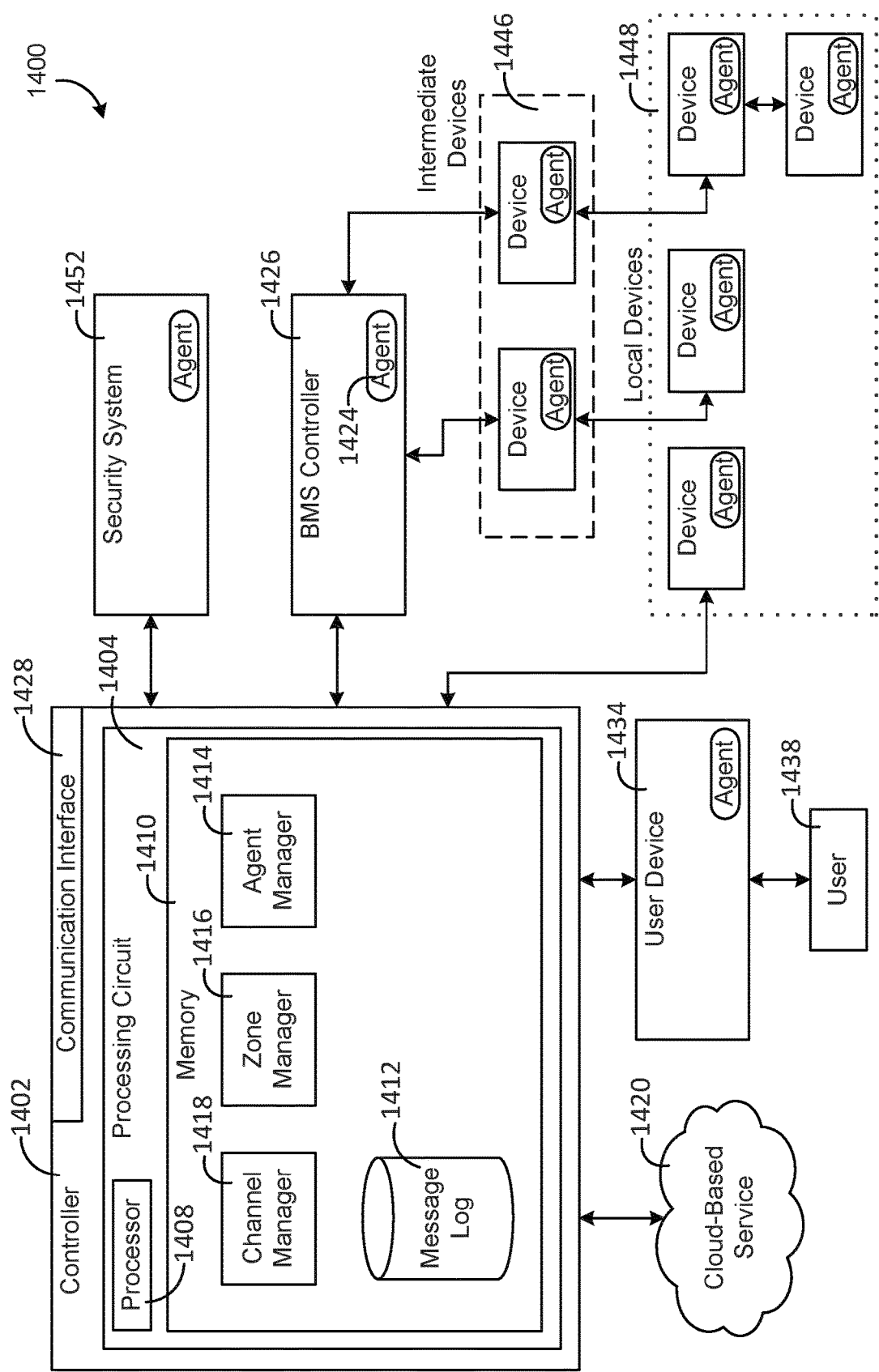
FIG. 14 is a block diagram illustrating an agent-based communication system, according to some embodiments.

Turning now to FIG. 14, a block diagram of an agent-based communication system 1400 is shown, according to one embodiment. The system 1400 may be any of the BMS systems described above. Further, the system 1400 may be a peer-to-peer (P2P) network, such as a Verisys system from Johnson Controls. The system 1400 may include a controller 1402. The controller 1402 may be a dedicated controller within a BMS. In one embodiment, the controller 1402 is a cloud-based server (i.e. an internet-based server). For example, the controller 1402 may be physically located in one or more server farms and accessible via an internet connection. In some examples, the controller 1402 may be a standalone device in a peer-to-peer (P2P) network, such as a Verisys system from Johnson Controls. The controller 1402 may include a processing circuit 1404. The processing circuit 1404 may include a processor 1408 and a memory 1410. The processor 1408 may be a general purpose or specific purpose processor, an application specific integrated circuit (ASIC), one or more field programmable gate arrays (FPGAs), a group of processing components, or other suitable processing components. The processor 1408 is configured to execute computer code or instructions stored in the memory 1410 or received from other computer readable media (e.g., CDROM, network storage, a remote server, etc.).

The memory 1410 may include one or more devices (e.g., memory units, memory devices, storage devices, etc.) for storing data and/or computer code for completing and/or facilitating the various processes described in the present disclosure. The memory 1410 may include random access memory (RAM), read-only memory (ROM), hard drive storage, temporary storage, non-volatile memory, flash memory, optical memory, or any other suitable memory for storing software objects and/or computer instructions. The memory 1410 may include database components, object code components, script components, or any other type of information structure for supporting the various activities and information structures described in the present disclosure. The memory 1410 may be communicably connected to the processor 1408 via the processing circuit 1404 and may include computer code for executing (e.g., by the processor 1408) one or more processes described herein. When the processor 1408 executes instructions stored in the memory 1410, the processor 1408 generally configures the processing circuit 1404 to complete such activities.

The memory 1410 is shown to include a channel manager 1418, a zone manager 1416, an agent manager 1414, and a message log database 1412. Although the channel manager 1418, the zone manager 1416, the agent manager 1414, and the message log database 1412 are shown in the memory 1410, in other embodiments one or more are provided separately from the memory 1410, such as within the BMS controller 1426, the security system 1452, or the cloud-based service 1420.

In some embodiments, the agent manager 1414 maintains a record of all agents previously generated and active within the system 1400. Further the agent manager 1414 may also maintain real time data relating to which agents are currently active, and which agents are not currently active. The agent manager 1414 may further maintain real time data relating to which device within the system 1400 a particular agent is currently associated with. For example, the agent 1424 may be associated with a BMS controller 1426 within a BMS of the system 1400. The BMS can be any combination of BMS devices as described herein. Further, the BMS can be understood to be a residential system, such as a home controller.

The agent manager 1414 may generate a number of agents, such as agent 1424, for use in the system 1400. The agents, as described herein, may be software applications that can run automated tasks (scripts). For example, the agents may be software applications that can read and/or write data to one or more devices of the system. In one embodiment, the agents may be able to generate their own software, and inject the software into one or more device it is associated with. The agents may further be capable of communicating with other agents, as will be described in more detail below, along with a more detailed description of the agents generally. The agent manager 1414 may generate an agent based on received information. In some embodiment, the agents are generated to perform a defined task. In other embodiments, the agents are generated to perform a defined set of tasks. In still further embodiments, the agents are generated having a desired goal, and allowed to determine how to meet the desired goal. In some examples, a generalized framework can be provided to a generated agent to provide constraints as to how the goal may be achieved. In further embodiments, the agent manager 1414 may modify an existing agent. For example, the agent manager 1414 may modify an existing agent to provide more functionality. In other examples, the agent manager 1414 may update the agent with additional information related to the device the agent is associated with, such as a new firmware ("FW") update, or additional hardware (e.g. a new I/O board for a controller). The agent manager 1414 may maintain a record of each agent (e.g., agent 1424) being associated with the BMS controller 1426, as well as the current status of the agent.

The agent manager 1414 may communicate the generated agents to the BMS via a communication interface 1428. The communication interface 1428 may be one or more wireless or wired interfaces. In some embodiments, the communication interface 1428 may include a wireless interface such as cellular (3G, 4G, LTE, CDMA, etc.), Wi-Fi, ZigBee, Bluetooth, RF, LoRa, etc. Additionally, the communication interface 1428 may include wired interfaces such as USB, Firewire, Lightning Connectors, CAT5 (wired internet), UART, serial (RS-232, RS-485), etc. In some embodiments, the communication interface 1428 may include a network connection, such as a BACnet network connection.

In some embodiments, the zone manager 1416 is configured to define a zone within one or more buildings or spaces. In some embodiments, the zone manager 1416 can be configured to define a building zone hierarchy that maps each room or portioned space within each floor of a building. In this regard, the zone manager 1416 can be configured to map or define each BMS device within the building zone hierarchy, for example by mapping the BMS device to a building space (e.g., a room of a building floor).

In some embodiments, the zone manager 1416 is configured to define a building control zone. The building control zone can be associated with a control circuit that regulates operation of a BMS device in response to an input, such as data point values of a building sensor. In this regard and as described herein, the channel manager can be configured to generate a communication channel for the building control zone and register agents associated with BMS devices to the generated communication channel.

In some embodiments, the zone manager 1416 is configured to define a physical location zone and/or a geolocation zone. The physical location zone and/or the geolocation zone can relate to a physical location of a person or a building device, such as a GPS position or a location within a building. In some embodiments, the physical location zone generally corresponds to a static location and the geolocation zone generally corresponds to moving location. In some embodiments, a physical location of a person can be determined based on any method disclosed herein, such as location information received from a computing device (e.g., the user device 1434) associated with a person. The zone manager 1416 can be configured to generate a geolocation zone that follows the computing device. Any size or type of physical location zone and geolocation zone can be used. For example, a geolocation zone can correspond to a circular area having a one-mile diameter with the computing device at the center. In some embodiments, the physical location zone and/or geolocation zone size can vary based on an input condition. For example, the zone manager 1416 can be configured to increase the size of the geolocation zone when a distance of the computing device relative to a location exceeds a particular threshold distance value.

The channel manager 1418 can be configured to generate a communication channel associated with a zone and manage registration of an agent to the communication channel. In this regard, when an agent is registered to a communication channel, the agent may receive and/or publish messages over the communication channel as described herein. For example, an agent associated with the computing device may be registered to a communication channel associated with a physical location zone when the geolocation overlaps with a portion of the physical location zone. In some embodiments, the channel manager 1418 can be configured to create a communication channel associated with a physical location zone in response to an occupancy level, as described herein.

In some embodiments, the channel manager 1418 can be configured to register a BMS device during commissioning of the BMS device. For example, if a new BMS device is added and mapped to a building space (e.g., a room or floor in a building), channel manager 1418 can be configured to automatically register the BMS device to a corresponding communication channel. In this regard, the zone manager 1416 can be configured to map the BMS device to a particular zone of the building, e.g., a physical location zone and/or a building control zone.

In some embodiments, the channel manager 1418 can be configured to create and/or manage a communication channel based on attributes associated with one or more agents. In an example implementation, employees of a business can each be associated with a computing device, whereby an agent associated with the computing device includes an attribute values indicating a job title, experience level, a health information, etc. The channel manager 1418 may be configured to create and/or manage a communication channel, for example to ensure the safety of the employees, mitigate business risks, and the like.

In some implementations, the channel manager 1418 is configured to perform security related tasks for a communication channel. In some embodiments, the channel manager 1418 can be configured to perform an authentication process prior to or during registration of an agent to a communication channel. Any suitable authentication process may be used, including password, tokenization, biometric, and/or multi-factor systems. In some embodiments, the authentication process may vary depending upon a level of access or risk associated with registration of an agent to a communication channel.

In some embodiments, the channel manager 1418 is configured to perform an authorization process to determine whether a particular agent has subscription access and/or a level of subscription access. For example, an agent associated with a temperature sensor may not be authorized to subscribe to messages, even though the agent is authorized to publish messages on a communication channel (e.g., relating to temperature measurements). In contrast, an agent associated with a thermostat may be also be authorized to subscribe to messages, for example to receive messages with information relating to a control setpoint. In either example, authorization may or may not be limited, e.g., to all messages of the channel, to building control messages of the channel, to temperature-related messages of the channel, etc.

As another example implementation, an agent associated with a computing device of an independent contractor may have only limited subscription access to messages published over a channel (e.g., to receive security alerts). In contrast, an agent associated with a computing device of a system level administrator or top-level executive may be authorized to receive all messages published over a channel.

In some embodiments, the channel manager 1418 is configured to perform an authorization process to determine whether a particular agent has publication access and/or a level of publication access. Publication access may be selectively configured based on the type of device, for example to limit the number of messages published over a channel and the corresponding data on the channel. For example, an agent associated with a building device may not have publication authorization or limited publication authorization based on a particular control circuit and inputs therein.

In some embodiments, the channel manager 1418 is configured to store authentication and/or authorization information as one or more attributes of an agent. In some embodiments, the channel manager 1418 may be configured to interact with other devices or systems described herein to facilitate authentication and/or authorization. In some embodiments, authentication and/or authorization processes are handled by other devices or systems described herein, and not by the channel manager 1418. In some embodiments, authentication and/or authorization processes are handled by one or more agents.

In some embodiments, the channel manager 1418 is configured to store published messages of a communication channel in the message log database 1412. In some embodiments, an agent can be configured to retrieve stored messages. For example, in some embodiments an agent may be configured with an attribute relating to whether the agent has an "active" status, i.e., whether the agent is actively receiving and/or publishing messages to the channel. For example, an agent with subscription to a communication channel may be "inactive," such that the agent does not actively receive published messages. In this regard, agent can subsequently retrieve unreceived messages from a database, as described herein.

The user device 1434 may be any device capable of communicating to the controller 1402, as well as providing a device for a user 1438 to interface with the system 1400. In some embodiments, the user device 1434 may include personal computing devices such as smart phones (iPhone, Android phone, Windows phone), tablet computers (iPad, Android Tablet, Windows Surface, etc.), laptop computers, and/or desktop computers. The user device 1434 may further include a stand-alone device such as an Amazon Echo, or even a non-mobile device such as a voice capable thermostat, or other dedicated user device.

The BMS controller 1426 may be any BMS controller as described herein. In some embodiments, the BMS controller 1426 may be a dedicated BMS interface device, such as an Athens Smart Hub device from Johnson Controls. In some embodiments, the controller 1402 is configured to communicate with the intermediate devices 1446 via the BMS controller 1426. Each of the intermediate devices 1446 and the local devices 1448 may be any BMS or HVAC device as described herein. In some embodiments, the intermediate devices 1446 may include device controllers, sub-system controllers, RTU's, AHU's, etc. In some embodiments, the local devices 1448 may include thermostats, valves, switches, actuators, etc. As shown in FIG. 14, there is no direct connection between the agent manager 1414 and the local devices 1448. Accordingly, the processing circuit 1404 may transmit the agent generation parameters to the local device 1448 via the BMS controller 1426 and one or more of the intermediate devices 1446.

In some embodiments, the agent generation parameters may include instructions to the BMS controller 1426 and the intermediate device 1446 to pass the agent generation parameters to the local device 1448 for installation. In still further embodiments, the agent generation parameters may be a fully functional agent, which, upon being received by the BMS controller 1426, can further propagate itself to the local device 1448 via the intermediate device 1446. For example, agent generation parameters may include system data, which allows the agent to map a path to the required local device 1116. Once the agent generation parameters have been received at local device 1448, an agent can install itself onto local device 1448. In some embodiments, the agent parameters are installed on a memory of the local device 1448, and an executable program file is executed using a processing device of the local device, thereby generating the agent within the local device 1448.

The security system 1452 may include multiple elements associated with a facility or building security system. For example, the security system 1452 can include multiple devices such as occupancy sensors or systems, cameras, microphones, motion detectors, thermal sensors, access devices (RFID locks, biometric locks, etc.), entry logs, etc. In one embodiment, the security system 1452 provides data to the controller 1402. The data may include occupancy data provided by the motion detectors and/or thermal sensors. Further, the data may include video and/or digital images provided by the cameras. In one embodiment, the digital images may be provided to the cloud-based service 1420 for processing via the controller 1402. For example, the cloud-based service 1420 may be a gesture recognition application, such as Microsoft Kinect.

Figure 15:
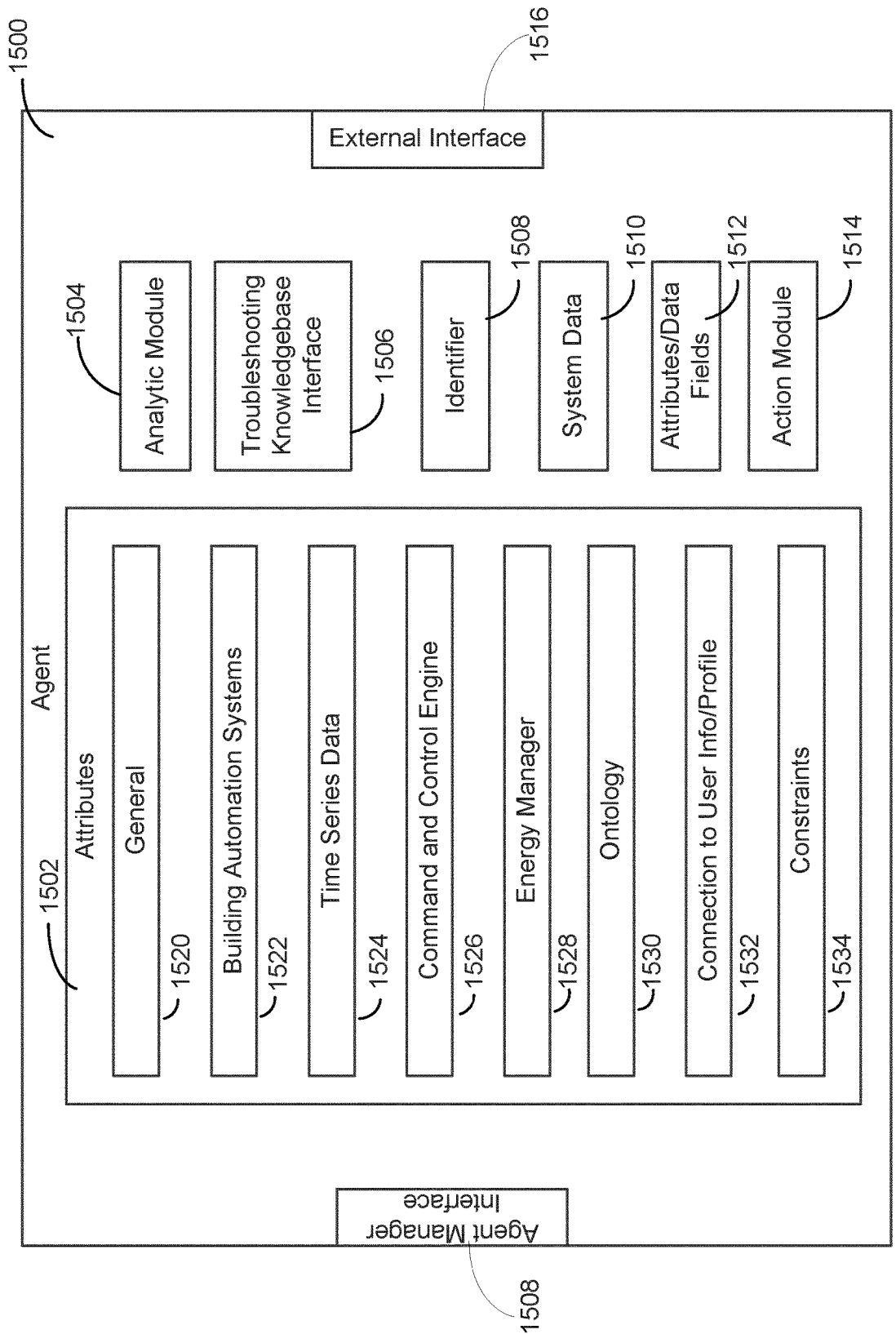
FIG. 15 is a block diagram illustrating a generated agent, according to some embodiments.

Turning now to FIG. 15, a block diagram of a generated agent 1500 is shown, according to one embodiment. The agent 1500 may include a number of attributes 1502, an analytic module 1504, a troubleshooting knowledgebase interface 1506, an identifier module 1508, a system data module 1510, an attributes/data field module, and an action module 1514. The agent 1500 may further include an external interface 1516 and an agent manager interface 1518. The attributes 1502 may be a number of connections and/or functions available to the agent 1500. As shown in FIG. 15, the agent 1500 may include a general attribute 1520, a building automation systems (BAS) attribute 1522, a time series data attribute 1524, a command and control engine attribute 1526, an energy manager attribute 1528, an ontology attribute 1530, a user info/profile attribute 1532, and a constraints attribute 1534. The attributes 1502 may be used, in conjunction with the other elements of the agent

1500 described above, by the agents to perform their designated operations. For example, the attributes 1502 can include rules, permissions, historical data, etc. which can be used to perform designated tasks by the agent 1500. In one example the attributes 1502 are located within the agent 1500. In one embodiment, the attributes 1502 simply provide for data access to the information associated with the attributes 1502. The information associated with the attributes 1502 may be gathered and provided by a central processing server, such as those described above.

The general attribute 1520 may include information such as schedules (i.e. operating schedules, PM schedules, occupancy schedules, etc.), environmental conditions (e.g. temperature, humidity, weather, etc.) time, date, or other relevant general information. In some embodiments, the general attribute 1520 includes information relating to whether an agent is active, or "listening" to messages within a communication channel. In one embodiment, the general attributes 1520 are connected to external sensors, services, or databases. In one embodiment, the general attributes 1520 may be provided by a controller, such as controller 1402 described above. The controller 1402 may have access to various services which can provide the general attributes 1520 to the agent 1500. Alternatively, the agent 1500 may have access to the same sensors and services that the controller 1402 may have. For example, the agent 1500 may be able to access weather information by communicating with one or more environmental sensors in a BMS. In other examples, the agent 1500 may have access to the internet and can access weather information from known weather websites relevant to the location of the BMS, (e.g. Yahoo Weather, WeatherBug, etc.). Alternatively, BMS influencers such as weather, and access to the internet of other cloud-based applications may be provided by the controller 1402.

The BAS attributes 1522 may include or have access to general building information such as layouts. The BAS attributes 1522 may further include or have access to information relating a BMS associated with the building, including control schemes, device information, etc. Further, the BAS attribute 1522 may have access to scheduling information relating to certain assets for the building. For example, the BAS attribute 1522 may have access to schedules for one or more conference rooms associated with the building. Additional schedules, such as building occupancy schedules may also be accessed by the BAS attributes 1522. The time series data attribute 1524 may provide access to long term data records related to multiple functions associated with a building. In one embodiment, the time series data may be stored on a database, such as database 516 above, and accessed by the time series data attribute 1524. The time series data attribute 1524 may be accessed by a training module or a task-conditioning module, such as those described above, to allow the agent 1500 to make decisions based on long term historical data. The command and control engine attribute 1526 may include the necessary data, including permissions, to allow the agent 1500 to perform control actions in addition to only monitoring actions.

The energy manager attribute 1528 may include an enterprise optimization system (EOS). The EOS may allow for direct communication with a utility provider such as a water company, a power company, water treatment plant, etc. to allow the agent 1500 to determine parameters such as utility rates, peak demand times, potential brown outs, etc. The energy manager attribute 1528 may further allow for communication with distributed energy storage (DES) systems. The connections associated with the energy manager attribute 1528 allow the agent 1500 to manage energy usage for a facility, building, or even an individual room within a building. The ontology attribute 1530 may provide a hierarchical listing of all the items within a given facility or building. Items may include one or more BMS devices (controllers, HVAC equipment, AHUs, VAVs, etc.), lighting, A/V resources, rooms, utilities, etc. In one embodiment, the ontology attribute 1530 provides spatial locations and configurations of BMS devices within a building or facility. The ontology attribute 1530 may further provide attributes between one or more BMS devices and an area of the building or facility. For example, the ontology attribute 1530 may provide information such as "damper BX1F affects area XYZ of building Q." In one embodiment, the ontology attribute 1530 may have access to the database 516, which may contain ontology data relating to a BMS, such as BMS.

The connection user info/profile attribute 1532 may include permissions associated with individual users. The connection user info/profile attribute 1532 may further include other information about the user, such as workspace location, work schedule, direct reports, supervisor, listed skills, job title or responsibilities, maintenance responsibilities, security access, etc. In some embodiments, the info/profile attribute 1532 includes information for authenticating an agent to a communication channel, such as password information, biometric information, etc. In some embodiments, the info/profile attribute includes authorization information, such as whether a level of access (e.g., security clearances) granted to the user and/or a level of access granted to the agent (e.g., read and/or write access to one or more communication channels). The above attributes examples are exemplary only, and it is contemplated that more attributes or fewer attributes may be used in the agent 1500, as required. Finally, the constraints attribute 1534 may include constraints applied to the agent. In one embodiment, the constraints can be implemented by the agent manager 1414 during generation of the agent 1500. In some embodiments, the constraints are system based. For example, the constraint attributes 1534 may include BMS related constraints such as fault tolerances, communication capabilities, etc. Example communication capability restrictions may include constraints based on system communication types (mesh, P2P, hierarchical, etc.). Further communication capability constraints may include baud rates, latency, bandwidth, etc. The constraint attributes 1534 may further include information system constrains such as system storage capacity, system and/or device processing capability, timing and synchronization of data to the system, etc.

The analytic module 1504 may be a computational module capable of analyzing data received via the agent manager interface 1518, or from the system via the external interface 1516. While FIG. 15 shows only a single analytic module 1504, it is contemplated that multiple analytic modules 1504 may be located within a single agent 1500. In some embodiment, an analytic module 1504 can be created for each type of data received by the agent 1500. In other embodiments, an analytic module 1504 may be created for each function or analysis function assigned to the agent. In some embodiments, the agent 1500 may generate analytic modules 1504 dynamically to better analyze data, or perform functions based on dynamically changing inputs. For example, the agent may detect a fault or other abnormal data pertaining to a BMS device. The agent 1500 may then create a new analytic module 1504 to receive the data and provide additional analysis.

The troubleshooting knowledgebase 1506 may provide a connection to a troubleshooting knowledgebase stored on a database, such as database 516. The troubleshooting knowledgebase interface 1506 may allow the agent 1500 to access data and information provided over time by multiple agents, as well as by user such as service personnel, administrators, smart devices, etc. For example, the agent 1500 may access one or more knowledgebases via the troubleshooting knowledgebase interface 1506 to obtain historical data regarding maintenance for a given device or system. The troubleshooting knowledgebase interface 1506 may therefore provide agents with historical maintenance data as well as previous solutions presented by the problems. In one embodiment, the agent 1500 may use one or more analytic modules 1504 to analyze data received by troubleshooting knowledgebase interface 1506 to help provide more helpful information to a user. For example, the agent 1500 may perform a statistical analysis on the historical data received via the troubleshooting knowledgebase interface 1506, such as a Monte Carlo analysis. This may be used to provide probabilities regarding possible problems and solutions with a given BMS device or system. The troubleshooting knowledgebase interface 1506 may allow the agent 1500 to analyze the historical data to perform problem categorization. Problem categorization may allow the agent 1500 to analyze similar historical problems similar to the current problem and provide data and/or suggestions to a user.

In some embodiments, multiple agents may be used in parallel to perform certain actions. For example, multiple agents may be used to address a problem by generating a hypothesis, and then subsequently testing the hypothesis. By using multiple agents, the workload can be spread out among multiple systems to allow for quicker analysis of data. In some examples, the parallel agents can use a divide and conquer technique to perform complex tasks more efficiently. For example, multiple agents can be generated to address a potentially faulty device. In one example, the agents are generated only as needed. Furthermore, the parallel agents can communicate with each other to build upon the information gathered/learned by an individual agent, thereby allowing for more effective performance by the parallel agents as a whole.

The identifier module 1508 may include identification data related to the generated agent 1500. In one embodiment, the identifier module 1508 can include a name and/or an address for the agent 1500 within the system. In some embodiments, the agent 1500 can generate its own address to allow for integration into an ad hoc network. In some embodiments, the identifier module 1508 may include other identification data of the agent 1500, such as assigned functionality, associated devices, communication protocol, size (e.g. kb, Mb, etc.), etc. In some embodiments, the data contained within the identifier module 1508 may allow other agents in the system 1400 to identify each other. This can be advantageous where multiple agents are present in a system, and or parallel agent architectures are implemented.

The system data module 1510 may include information regarding the devices in the system 1400. Further, the system data module 1510 may include information such as communication protocols used between devices, the communication architecture (mesh, P2P, hierarchical), available communication ports, etc. The system data module 1510 may further provide communication data such as required handshaking for communication between devices, and or in-kind communications. The system data may further include information relating to other active agents.

The attributes/data fields module 1512 may include attributes of the agent 1500. In some embodiments, the attributes can be those attributes provided by the agent manager 1414 during the generation of the agent 1500. In other embodiments, the attributes can be learned attributes. In some embodiments, the agent 1500 can be configured to learn attributes over time. Example learned attributes may include report formats, data values, etc. The attributes/data fields module 1512 may further include values received via the external interface 1516 from the system, or via the agent manager interface 1518. In some embodiments, the values are sensed values, such as those provided by various sensing devices within a system. For example, voltage sensors, current sensors, temperature sensors, pressure sensors, etc., may all provide sensed values to the agent 1500. The values may also be inferred values. In one example, the analytic module 1504 may analyze one or more measured values provided by the attributes/data fields module 1512 and infer one or more values associated with the measured values and store the inferred value in the attributes/data fields module 1512. For example, the analytic module 1504 may receive a measured current flow value (Amps) associated with a coil of an actuator from the attributes/data fields module 1512. The analytic module 1504 may then infer a temperature of the actuator and provide that inferred data to the attributes/data fields module 1512.

Finally, the agent may include an action module 1514. The action module 1514 may generate outputs that can be output via the external interface 1516 and/or the agent manager interface 1518. For example, the action module 1514 may output a changed setpoint to a device in the BMS via the external interface 1516. In one embodiment, the action module 1514 may change the setpoint based on data provided by the analytic module 1504, the troubleshooting knowledgebase interface 1506 and/or one or more of the attributes 1502. In other embodiments, the action module may output data to a user via the agent manager interface 1518. For example, the action module 1514 may generate a report to be provided to a user, which can be communicated to the controller 1402 via the agent manager interface 1518. The controller 1402 may then output the report to a user via one or more of the user device 1434. In one embodiment, the agent manager interface 1518 may provide direct communication to the agent manager 1414. In other embodiments, the agent manager interface 1518 may communicate with the agent manager 1414 via a communication link to the controller 1402. The above modules and attributes shown within agent 1500 are exemplary only, and it is considered that more modules/attributes and/or less modules/attributes may be present in an agent.

Figures 16, 17:
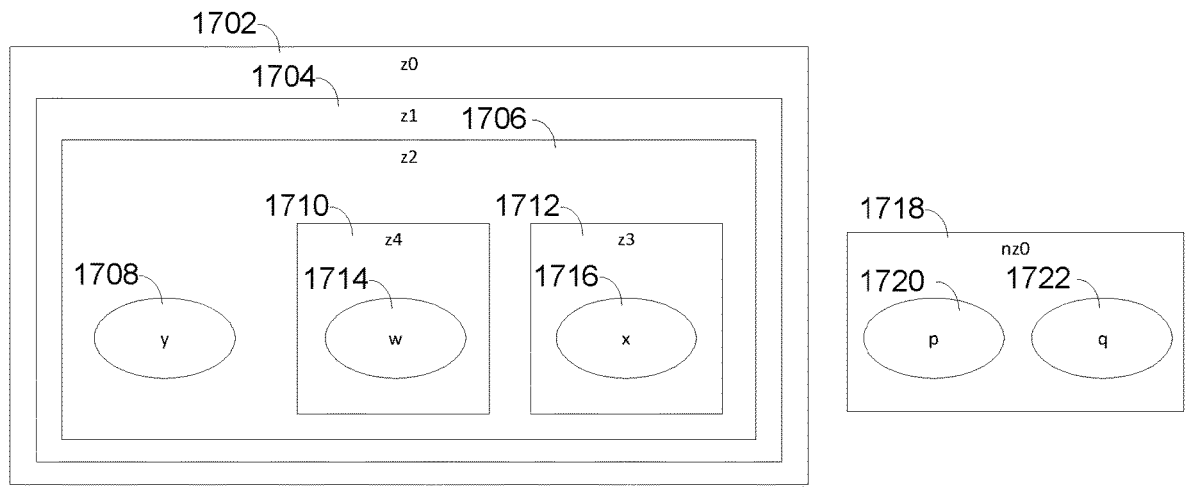
FIG. 16 is a code snippet which can be automatically generated by a software agent to create a building zone hierarchy and associated communication channel, according to some embodiments.
FIG. 17 is a block diagram illustrating a building zone hierarchy, according to some embodiments.

Turning now to FIGS. 16-17, an example code snippet 1600 is shown, defining a portion of a building zone hierarchy 1700 associated with the generation of a dynamic communication channel infrastructure. In some embodiments, the agent may create the building zone hierarchy 1700. The building zone hierarchy 1700 may include multiple IoT devices, assigned to various zones within a BMS. In one embodiment, the zones may be physical zones, such as floors, rooms, or other partitioned areas of a building. In other embodiments, the zones may be associated with certain topics. For example, one or more of the zones may be associated with BMS related topics, such as a control circuit or loop for regulating or optimizing an HVAC device. Topics can relate to any building management function or feature, such as temperature control, humidity control, security, lighting, etc.

In some embodiments of the building zone hierarchy 1700, one or more of the zones may be defined according to a parent-child relationship. The example code 1600 is intended to illustrate how a building zone hierarchy and various parent-child relationships can be configured, according to an example embodiment. Accordingly, the example code 1600 is not intended to limit embodiments to particular programming languages, parent-child relationships, implementations, and the like. In the example code 1600, zone z0 is configured to have a parent relationship relative to a child zone, z1. In this example, zone z0 may represent a campus or a set of buildings, and zone z1 may represent one building in the campus. Zone z1 is configured to include zone z2, which may represent a floor within a building. In the example code 1600, the zone z2 is configured to include zone z3 and zone z4, which may represent rooms within the floor represented by zone z2. In some embodiments, one or more of the zones may be independent of each other. For example, zone nz0 is configured to be independent of zone z0. Accordingly, child zones of nz0 are also independent of child zones of zone z0.

Referring to FIG. 17, a block diagram illustrating an example building zone hierarchy 1700 is shown, according to some embodiments. In one example, one or more of the zones may be associated with a building. For example, in some embodiments zone 1702 may correspond to a building. In this example, the building may have multiple floors, rooms, and/or partitioned areas which can each have multiple pieces of equipment connected within each of the rooms.

An agent-based communication system can be configured to facilitate communications among various devices, including BMS devices and other computing devices, dispersed throughout the building. In some embodiments, communication to a device partially depends on the device's relationship to one or more zones. A communication channel may be generated for each zone, and an "agent" may be provided for each device. An agent can be configured to publish messages to the communication channel and/or receive messages published by other agents to the communication channel.

In some embodiments, one or more zones correspond to building spaces defined according to a building zone hierarchy having various parent-child relationships. For example, a top-level or "parent" zone may correspond to a building, and each floor within the building may correspond to a "child" relationship relative to the zone of the building. Further, each room within a particular floor may correspond to a child relationship relative to the floor. BMS devices (e.g., thermostats, HVAC devices, sensors) and other computing devices (e.g., a personal device) may be mapped within particular zones. Accordingly, when an agent of one device publishes a message to a channel associated with a zone (e.g., a room), another agent may automatically receive the message based on a particular parent-child relationship and the configuration of the communication channel. In some embodiments, messages published over a communication channel can be archived for subsequent retrieval.

Referring to FIG. 17, the building zone hierarchy 1700 is shown to include a first zone 1702. The first zone 1702 may serve as a top-level zone for subsequent zones, and, as such, may represent a supervisory system or device within the BMS. A second zone 1704, which may represent a building, is shown within the first zone 1702. A third zone 1706, which may represent a floor in the building, is shown within the second zone 1704. The third zone 1706 includes a first agent 1708. The first agent 1708 may correspond to a BMS device or computing device, and may therefore handle communications to and from the device as described herein. The third zone 1706 is shown to include the fourth zone 1710 and the fifth zone 1712, which may each correspond to a room within the floor. The fourth zone 1710 includes a second agent 1714 and the fifth zone 1712 may include a third agent 1716. The sixth zone 1718 is shown to be outside the first zone 1702 and includes a fourth agent 1720 and a fifth agent 1722.

Figure 18:
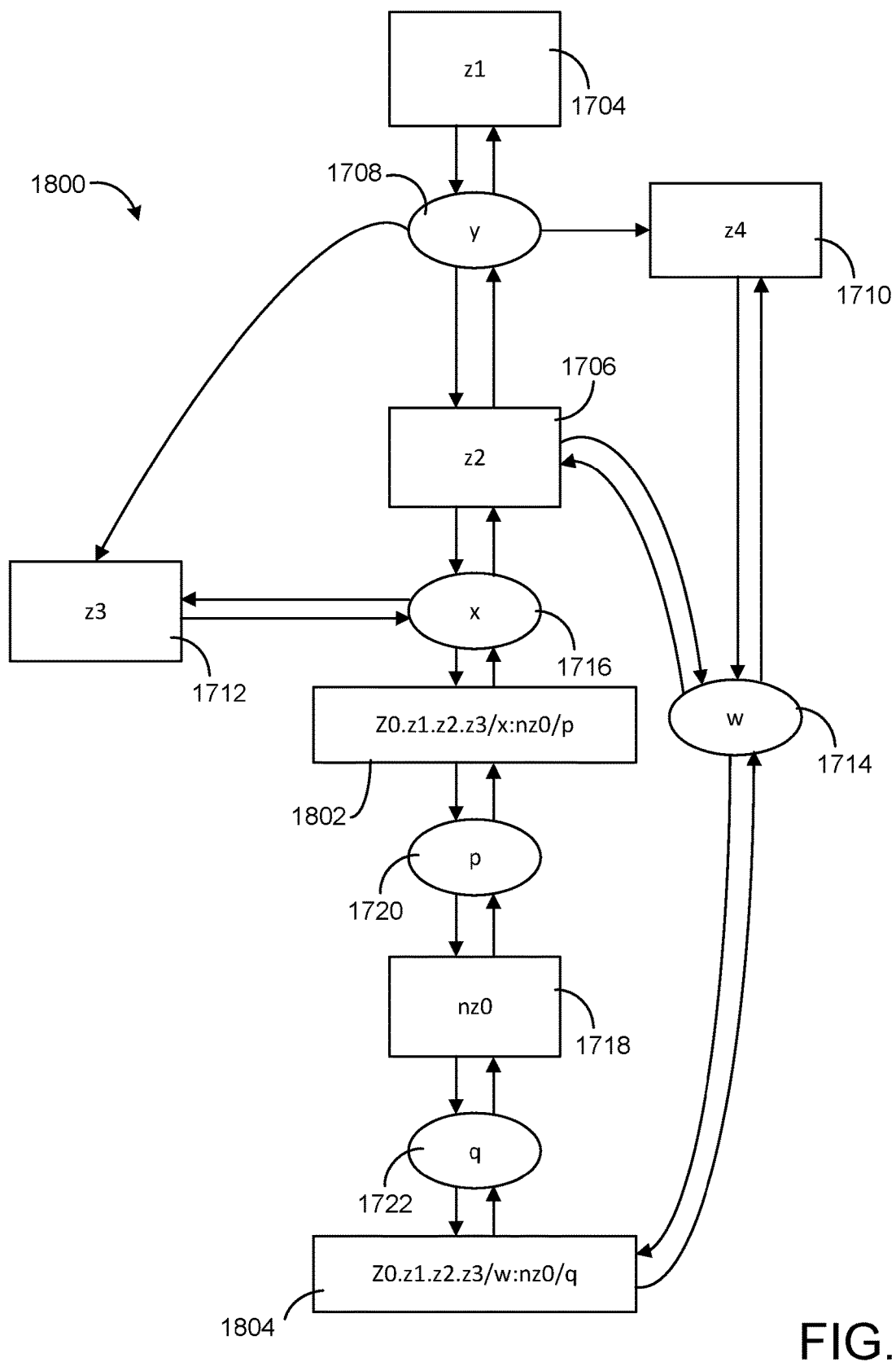
FIG. 18 is a flow diagram illustrating a communication channel, according to some embodiments.

Turning now to FIG. 18, an example communication channel system 1800 based on the zone hierarchy 1700 is shown, according to some embodiments. In some embodiments, communication channel system 1800 represents a plurality of individual communication channels. In some embodiments, a controller (e.g., the controller 1402) can be configured to dynamically adjust the communication channel system 1800 as described herein.

In some embodiments, one or more of the agents in the system 1800 is configured to publish messages to a communication channel associated with a particular zone, e.g., to have write access to the communication channel. In some embodiments, one or more agents is configured to subscribe to messages associated with a particular zone, e.g., authorization to have read access to published messages of the communication channel. Each agent may be configured with various authorization levels for read access and/or write access to any number of communication channels associated with zones. For example, the first agent 1708 may only have authorization for write access to the fourth zone 1710, but have read and write access to the third zone 1706. In some embodiments, authentication and authorization access is determined using agent attributes as described in FIG. 15 and herein. In some embodiments, access to an individual device can be established when configuring one or more components in the BMS. In other embodiments, the zones may regulate what access devices outside the respective zones can have.

In some embodiments, the first zone 1702 is the channel/topic name, and the second zone 1704 is the top-level or lead zone associated with communication channel system 1800. In the example communication channel system 1800, the first agent 1708 can be configured to communicate with a communication channel associated with the second zone 1704. The first agent 1708 may be configured to communicate with communication channels corresponding to the fourth zone 1710 and the third zone 1706.

As further shown in FIG. 18, the first agent 1708 and the third agent 1716 each is configured to communicate with a channel associated with the third zone 1706. Even though the third agent 1716 is shown within the fifth zone 1712 of the building zone hierarchy 1700, the fifth zone 1712 is a child zone relative to the third zone 1706, and thus messages of the third agent 1716 can be shared "upstream" with the communication channel corresponding to the third zone 1706. In some embodiments, a communication channel may be configured to supplement or limit access reading and/or writing access, based on particular parameters or authorizations granted to an agent. For example, the first agent 1708 is shown to have write access to the fifth zone 1712, even though the first agent 1708 is outside the fifth zone 1712.

The communication channel system 1800 is shown to include a collaborative zone 1802 and a collaborative zone 1804. The collaborative zone 1802 and the collaborative zone 1804 can be configured facilitate control circuits or loops that include devices across zones in one or more building zone hierarchies. For example, the collaborative zone 1802 facilitates communication between the fourth agent 1820 and the third agent 1816, even though each agent corresponds to a device in a separate parent-child arrangement. In this regard, the collaborative zone 1802 may have a corresponding communication channel as described herein. Similarly, the collaborative zone 1804 may facilitate communication via another communication channel between the second agent 1714 and the fifth agent 1722.

In some examples, the building itself, via a controller or other supervisory device associated with the building, may communicate with a given room via a room agent. In some examples, a communications channel may be in place for a particular room, with devices associated with the room being subscribed to the channel. For example, the agents associated with the devices associated with the room, such as the thermostat associated with the agent 1720 and the HVAC device associated with the agent 1722 may subscribe to the room channel, and publish information onto the room channel once they have subscribed. In some examples, the building may tell one or more rooms that "it is going to stop raining and the sun will come out." The building may not know what equipment is in the room, but the equipment in the room may hear the information provided by the building and take appropriate actions. For example, the HVAC device associated with the agent 1722 may decide to pre-cool some areas of the room, as the HVAC device may know that some portions of the room, or the room itself is harder to cool down when there is intense solar radiation. Further, a separate device may decide to lower the blinds to reduce the solar radiation entering the room. In another example, the thermostat associated with the agent 1720 might announce to the room that it is in an away mode, and the lights may then determine that they should turn off. This allows the lights to be controlled by a communication from the thermostat, without requiring any knowledge about the lights. In this regard, the agent 1720 may include an attribute as described herein for identifying that the agent 1720 is in the away mode.

In one example implementation, a communication channel can be associated with a control circuit or a building control zone. In some embodiments, a building control zone can relate to regulating a temperature within a building or optimizing energy usage in the building. Various BMS devices can configured and mapped for the building, and an agent may be provided for each of the BMS devices. For example, a building control hierarchy can include a several floors, each having a number of rooms. Each floor may include a thermostat, and each room can include an occupancy sensor.

Each of the BMS devices in this implementation may have an associated agent that is registered to the building control zone communication channel. Each agent can be configured to publish and/or receive messages of the communication channel, for example based on the type of BMS device the agent is associated with and/or the location of the BMS device within the building zone hierarchy. For example, the agent associated with a thermostat can be configured to publish messages to the communication channel relating to temperature measurements, and may be further configured to receive messages (e.g., indicating a control setpoint). The agent associated with each VAV can publish messages relating to a measured air temperature and air pressure. In some embodiments, the agent associated with an occupancy sensor can be configured to publish messages associated with an occupied status (e.g., occupied or unoccupied), and/or with a number of individuals within a room. In some embodiments, the agent associated with the occupancy sensor can also be configured to receive messages, for example to an emergency alert received from an agent associated with a security system.

In this example implementation, one or more BMS devices can be operated based on input information, i.e., published messages of the building control zone communication channel. For example, the thermostat or a building controller can be configured to use input information received as published messages for operating a control algorithm. In some embodiments, the building control zone communication channel can be dynamically created based on a level of occupancy within a room. This may be particularly useful for building control systems having large buildings and/or several buildings, as one or more rooms or zones may often be unoccupied. Accordingly, when a room becomes occupied, a building control zone communication channel can be created, and/or modified dynamically. In this regard, each room may have an occupancy sensor and an associated communication channel, and the agent associated with occupancy sensor can publish messages indicating an occupancy level. The dynamically created building zone communication channel as configured herein can be beneficial over other configurations because the building zone communication channel acts as a "filtered" communication channel, i.e., it does not include messages published by other agents (e.g., other BMS devices). In this regard, agents or devices can more quickly retrieve stored or published messages of the communication channel, increasing computational speed and efficiency.

Figure 19:
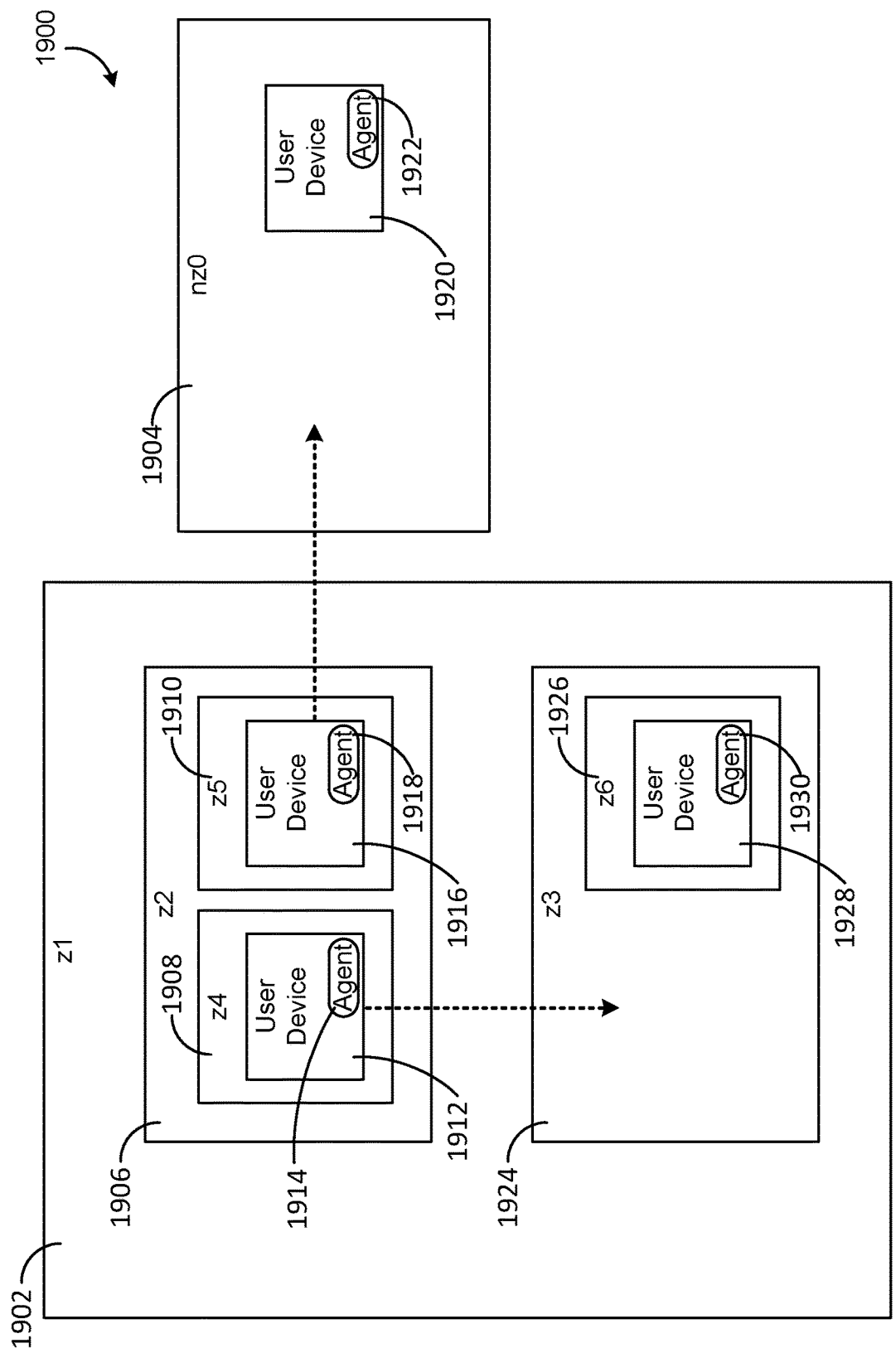
FIG. 19 is a block diagram illustrating another building zone hierarchy, according to some embodiments.

Referring to FIG. 19, a block diagram of another building zone hierarchy 1900 is shown, according to an example embodiment. The building zone hierarchy 1900 includes various zones that may be each defined according to parent-child relationships as described herein. The building zone hierarchy 1900 is shown to include zone 1902 and zone 1904. In some embodiments, zone 1902 may correspond to a separate location than the location of zone 1904. Zone 1902 includes zone 1906 and zone 1924, and thus zone 1902 is a parent zone to child zones, zone 1906 and zone 1924. Similarly, zone 1906 includes zone 1908 and zone 1910, and thus zone 1906 is a parent zone to child zones, zone 1908 and 1910. In one implementation, zone 1902 corresponds to a building, and zone 1906 and zone 1924 each correspond to a floor of the building. Zone 1908 and zone 1910 may each correspond to a room in a first floor corresponding to zone 1906, and zone 1926 may correspond to a room in the second floor corresponding to zone 1924.

In this arrangement, a communication channel corresponding to a parent zone can be configured to receive all "downstream" messages from one or more child zones. For example, it may be desirable to monitor movement of user device 1912, user device 1916, and user device 1928 throughout the child zones of zone 1902. In this regard, the agent 1914 and the agent 1918 can be automatically registered to communication channels corresponding to the zone 1902 and/or zone 1906, because user device 1912 and the user device 1916 are within a child zone (i.e., zone 1908 and zone 1910, respectively) relative to each of zone 1902 and zone 1906. Accordingly, when the user device 1912 moves from zone 1906 to zone 1924, the user device 1912 is still within a child zone of zone 1902 but is no longer within a child zone of zone 1906. Accordingly, messages published by the agent 1914 may still be published to the communication channel associated with the zone 1902, they may no longer be published to the communication channel associated with the zone 1906.

In other arrangements, a communication channel corresponding to a child zone can be configured to receive all "upstream" messages from one or more parent zones. For example, it may be desirable for the agent 1918 to receive a security alert published in a communication channel of zone 1902, as the security alert may pertain to the entire building (i.e., all child zones to zone 1902). However, a security alert published in the zone 1924 may only be relevant to occupants in the zone 1924, and thus agents corresponding to user devices in the zone 1906 may not receive the security alert. In other arrangements, it may be desirable to monitor changes in occupancy and temperature of each floor and room, via agents of BMS devices (not shown) provided throughout various child zones in the building.

In some embodiments one or more of the zones 1902, 1904, 1906, 1908, 1910, and 1924 may each correspond to a physical location zone. A physical location zone may correspond to a predetermined area around a physical location, such as a building, an area within a building, or an area outside the building. The predetermined area may be any size or shape, such as a circular area with a radius of one mile or a floor within a building. In some embodiments, one or more users may each be associated with a computing device (e.g., the user device 1912, the user device 1916) having a corresponding agent, and a geolocation zone may relate to a predetermined area around the computing device. The predetermined area may be any size or shape, such as a circular area with a radius of five miles.

In some embodiments, when a geolocation zone overlaps with another geolocation zone and/or a physical location zone, a communication channel may be dynamically generated as described herein. For example, when the user device 1912 moves to the zone 1924, a communication channel may be dynamically generated because an overlap is detected with regard to the geolocation zone of user device 1912 and a physical location zone associated with the zone 1924. In this example, an occupancy sensor (not shown) in the zone 1924 may have detected the presence of the user device 1912 in the zone 1924. In some embodiments, one or more agents may be automatically registered to a communication channel. For example, the agent 1914 and the agent 1930 may be automatically registered to the communication channel when the overlap is detected. In some embodiments, one or more agents may be automatically de-registered to a communication channel, for example when the overlap is no longer detected.

Similarly, when the user device 1916 moves to zone 1904, a communication channel may be dynamically generated because an overlap is detected with regard to the geolocation zone of user device 1916 and a physical location zone associated with zone 1904. The zone 1904 may correspond to a physical location associated with a building, postal address, city, and the like. Alternatively or additionally, a communication channel may be dynamically generated because an overlap is detected with regard to the geolocation zone of user device 1916 and the geolocation zone of user device 1920. In some embodiments, one or more agents may be automatically registered and/or de-registered to a communication channel as described herein.

Figure 20:
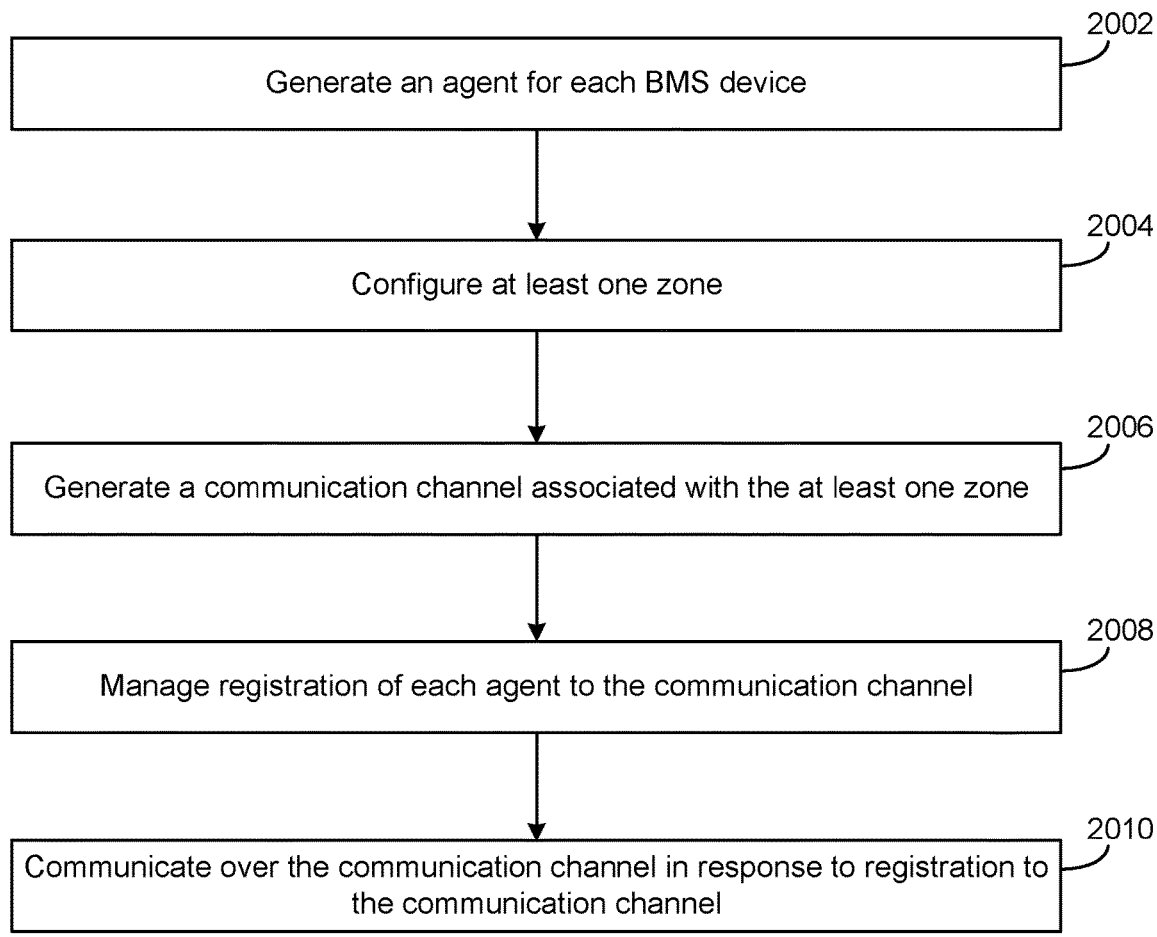
FIG. 20 is a flow chart of a process for dynamically generating a communication channel, according to some embodiments.

Referring to FIG. 20, a process 2000 for dynamically generating a communication channel is shown, according to some embodiments. In some embodiments, one or more steps of the process 2000 may be performed by a top-level or supervisory controller (e.g., the controller 1402).

At step 2002, an agent corresponding to one or more BMS devices is generated. In some embodiments, step 2002 involves generating an agent for each BMS device within a building space. An agent, as described herein, may be a software application that can run automated tasks (scripts). For example, an agent may be a software application that can read and/or write data to one or more devices of the system. In one embodiment, an agent may be able to generate its own software, and inject the software into one or more device it is associated with. An agent may further be capable of communicating with other agents, as described herein.

In some embodiments, an agent is generated to perform a defined task or set of tasks. In still further embodiments, an agent is generated having a desired goal, and configured to determine how to meet the desired goal. In some examples, a generalized framework can be provided to a generated agent to provide constraints as to how the goal may be achieved. In some embodiments, generating an agent includes defining or configuring a set of attributes of the agent as described herein, such as information relating to a user.

At step 2004 at least one zone is configured. In some embodiments, step 2004 involves configuring at least one zone relating to a physical location zone or a building control zone. In some embodiments, step 2004 involves defining a zone within one or more buildings or spaces. In some embodiments, step 2004 involves defining a building zone hierarchy that maps each room or portioned space within each floor of a building. In this regard, step 2004 may involve mapping or defining each BMS device within the building zone hierarchy, for example by mapping the BMS device to a building space (e.g., a room of a building floor).

In some embodiments, step 2004 involves defining a building control zone. The building control zone can be associated with a control circuit that regulates operation of a BMS device in response to an input, such as data point values of a building sensor. In some embodiments, step 2004 involves defining a physical location zone and/or a geolocation zone. The physical location zone and/or the geolocation zone can relate to a physical location of a person or a building device, such as a GPS position or a location within a building. In some embodiments, the physical location zone generally corresponds to a static location and the geolocation zone generally corresponds to moving location. In some embodiments, a physical location of a person can be determined based on any method disclosed herein, such as location information received from a computing device (e.g., the user device 1434) associated with a person. In some embodiments, step 2004 involves defining a geolocation zone that follows the computing device. Any size or type of physical location zone and geolocation zone can be used. For example, a geolocation zone can correspond to a circular area having a one-mile diameter with the computing device at the center. In some embodiments, the physical location zone and/or geolocation zone size can vary based on an input condition. For example, a size of the geolocation zone can be increased when a distance of the computing device relative to a location exceeds a particular threshold distance value.

At step 2006, a communication channel associated with the at least one zone is generated. In this regard, when an agent is registered to a communication channel, the agent may publish messages on the communication channel and/or receive published messages by subscribing to the communication channel as described herein. For example, an agent associated with the computing device may be registered to a communication channel associated with a physical location zone when the geolocation overlaps with a portion of the physical location zone. In some embodiments, step 2006 involves creating a communication channel associated with a physical location zone in response to an occupancy level, as described herein.

At step 2008, registration of each agent to the communication channel is managed. In some embodiments, step 2008 involves creating and/or managing a communication channel based on attributes associated with one or more agents. In an example implementation, employees of a business can each be associated with a computing device, whereby an agent associated with the computing device includes an attribute values indicating a job title, experience level, a health information, etc. In some embodiments, step 2008 involves creating a communication channel based on a calculated risk defined by an algorithm, for example to ensure the safety of the employees, mitigate business risks, and the like.

In some embodiments, step 2008 involves performing security related tasks for a communication channel. In some embodiments, step 2008 involves performing an authentication process. Any suitable authentication process may be used, including password, tokenization, biometric, and/or multi-factor systems. In some embodiments, the authentication process may vary depending upon a level of access or risk associated with registration of an agent to a communication channel. In some embodiments, step 2008 involves performing an authorization process, for example to determine whether a particular agent has subscription and/or publication access.

At step 2010, one or more agents communicates over the communication channel. When an agent of one device publishes a message to a channel associated with a zone (e.g., a room), another agent that subscribes to that channel may automatically receive the message as described herein. In some embodiments, messages published over a communication channel can be archived for subsequent retrieval. In some embodiments, read and write access to a particular channel depends on an authorization level of an agent, as described herein. In some embodiments, an agent may be automatically de-registered to a communication channel. For example, when a geolocation zone corresponding to a user device no longer overlaps with a physical location zone, the agent associated with the user device may be de-registered from the communication channel.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

What is claimed is:

1. A method for managing a communication channel, the method comprising:
   generating, by a controller, an agent corresponding to each of a set of building management system (BMS) devices;
   configuring, by the controller, at least one zone relating to a physical area of a building, the physical area of the building included within a second physical area of the building relating to a second zone;
   generating, by the controller, the communication channel associated with the at least one zone and a second communication channel associated with the second zone;
   managing, by the controller, registration of one agent to the communication channel; and
   communicating, by the one agent, over the communication channel in response to being registered to the communication channel, wherein the controller publishes messages of the communication channel in the second communication channel based on a hierarchy, the hierarchy indicating that the physical area is included within the second physical area.

2. The method of claim 1, wherein communicating, by the one agent, over the communication channel comprises at least one of publishing messages or receiving messages published by other agents on the communication channel.

3. The method of claim 2, further comprising:
   storing, by the controller, published messages of the communication channel in a database.

4. The method of claim 1, wherein each of the set of BMS devices is provided in a physical space of the building, the physical space relating to at least one of a floor, a room, or partitioned area of a building.

5. The method of claim 4, further comprising:
   defining, by the controller, a building control zone associated with a control circuit, the control circuit relating to regulating operation of an HVAC device in response to data point values of a building sensor;

generating, by the controller, the communication channel for the building control zone; and registering, by the controller, a sensor agent for the building sensor and an HVAC device agent for the HVAC device to the communication channel.

6. The method of claim 5, further comprising:

publishing, by the sensor agent for the building sensor, the data point values to the communication channel;

receiving, by a controller agent for the controller, the data point values;

publishing, by the controller agent for the controller, messages to the communication channel for controlling operation of the HVAC device based on the data point values; and receiving, by the HVAC device agent for the HVAC device, the messages published by the controller.

7. The method of claim 1, further comprising:

generating, by the controller, a computing device agent corresponding to a computing device associated with a user;

receiving, by the controller, data relating to a physical location of the computing device; and generating, by the controller, a geolocation zone based on the physical location of the computing device.

8. The method of claim 7, further comprising:

registering, by the controller, the computing device agent corresponding to the computing device to the communication channel in response to the controller determining at least a portion of the geolocation zone overlaps with at least a portion of the physical area of the building.

9. The method of claim 8, further comprising:

publishing, by the computing device agent corresponding to the computing device, a message to the communication channel indicating a presence of the computing device within the physical area of the building.

10. A building system comprising one or more storage devices storing instructions thereon that, when executed by one or more processors, cause the one or more processors to implement:

an agent manager configured to generate an agent for each of a plurality of building devices;

a zone manager configured to define at least one zone relating to a physical area of a building, the physical area of the building included within a second physical area of the building relating to a second zone; and a channel manager configured to generate a communication channel associated with the at least one zone and a second communication channel associated with the second zone, the channel manager further configured to manage registration of one agent to the communication channel, wherein the one agent is configured to communicate over the communication channel in response to being registered to the communication channel, wherein the channel manager publishes messages of the communication channel in the second communication channel based on a hierarchy, the hierarchy indicating that the physical area is included within the second physical area.

11. A system for managing communication between building management system (BMS) devices, the system comprising:

a memory having instructions stored thereon; and a controller configured to execute the instructions to implement:

an agent manager configured to generate an agent for each of the BMS devices;

a zone manager configured to define at least one zone relating to a physical area of a building, the physical area of the building included within a second physical area of the building relating to a second zone; and a channel manager configured to generate a communication channel associated with the at least one zone and a second communication channel associated with the second zone, the channel manager further configured to manage registration of one agent to the communication channel, wherein the one agent is configured to communicate over the communication channel in response to being registered to the communication channel, wherein the channel manager publishes messages of the communication channel in the second communication channel based on a hierarchy, the hierarchy indicating that the physical area is included within the second physical area.

12. The system of claim 11, wherein the one agent communicates over the communication channel by at least one of publishing messages or receiving messages published by other agents on the communication channel.

13. The system of claim 12, wherein the channel manager is configured to store published messages of the communication channel in a database.

14. The system of claim 11, wherein the BMS devices comprises at least one of a building sensor, an HVAC device, a building controller, a lighting controller, or a security device.

15. The system of claim 11, wherein each of the BMS devices is provided in a physical space of the building, the physical space relating to at least one of a floor, a room, or partitioned area of a building.

16. The system of claim 15, wherein the zone manager is configured to define a building control zone associated with a control circuit, the control circuit relating to regulating operation of an HVAC device in response to data point values of a building sensor, wherein the channel manager is configured to generate the communication channel for the building control zone and register, to the communication channel, a sensor agent for the building sensor and an HVAC device agent for the HVAC device.

17. The system of claim 16, wherein the sensor agent for the building sensor is configured to publish the data point values to the communication channel, wherein building controller agent for a building controller is configured to receive the data point values and to publish messages to the communication channel for controlling operation of the HVAC device based on the data point values, and wherein the HVAC device agent for the HVAC device is configured to receive the messages published by the controller from the communication channel.

18. The system of claim 11, wherein the zone manager is further configured to receive, from a computing device associated with a user, data relating to a physical location of the computing device and to generate a geolocation zone based on the physical location of the computing device, and wherein the agent manager is further configured to generate a computing device agent for the computing device.

19. The system of claim 18, wherein the channel manager is configured to register the computing device agent corresponding to the computing device to the communication channel in response to the zone manager determining at least a portion of the geolocation zone overlaps with at least a portion of the physical area of the building.

20. The system of claim 19, wherein the computing device agent corresponding to the computing device is configured to publish a message to the communication channel indicating a presence of the computing device within the physical location of the building.

* * * * *